US011838413B2

(12) United States Patent
Bastable et al.

(10) Patent No.: US 11,838,413 B2
(45) Date of Patent: Dec. 5, 2023

(54) CONTENT RECOGNITION SYSTEMS AND METHODS FOR ENCRYPTED DATA STRUCTURES

(71) Applicant: Synamedia Limited, Staines upon Thames (GB)

(72) Inventors: Ian Bastable, London (GB); Gareth Bowen, London (GB)

(73) Assignee: SYNAMEDIA LIMITED, Staines upon Thames (GB)

( * ) Notice: Subject to any disclaimer, the term of this patent is extended or adjusted under 35 U.S.C. 154(b) by 234 days.

(21) Appl. No.: 16/660,761

(22) Filed: Oct. 22, 2019

(65) Prior Publication Data

US 2021/0119792 A1    Apr. 22, 2021

(51) Int. Cl.
*H04L 9/08* (2006.01)
*G06F 21/10* (2013.01)
(Continued)

(52) U.S. Cl.
CPC ............ *H04L 9/0894* (2013.01); *G06F 21/10* (2013.01); *H04L 9/0819* (2013.01);
(Continued)

(58) Field of Classification Search
CPC ... H04L 9/0894; H04L 9/0819; H04L 9/3271; H04L 63/0435; H04L 63/0478;
(Continued)

(56) References Cited

U.S. PATENT DOCUMENTS

| 8,812,874 B1 * | 8/2014 | Clifford | ................ G06F 21/602 |
| | | | 713/193 |
| 2005/0154889 A1 * | 7/2005 | Ashley | ................ H04L 63/0823 |
| | | | 713/171 |

(Continued)

FOREIGN PATENT DOCUMENTS

EP    2273409    1/2011

OTHER PUBLICATIONS

International Search Report, International Application No. PCT/IB2020/000847 for Synamedia Limited, dated Feb. 15, 2021 (17 pages).

(Continued)

*Primary Examiner* — Farid Homayounmehr
*Assistant Examiner* — Brian William Avery
(74) *Attorney, Agent, or Firm* — FINNEGAN, HENDERSON, FARABOW, GARRETT & DUNNER, LLP

(57) ABSTRACT

A system for maximizing storage of encrypted content in a storage system includes one or more processors; and a storage medium storing instructions. When executed, the instructions may configure the one or more processors to: receive, from a first client device, a first data structure encrypted commutatively with a first key and a common key, the receiving system lacking access to the common key; receive the first key and a first segment identifier; receive, from a second client device, a second data structure encrypted commutatively with a second key and the com- (Continued)

mon key; receive a second segment identifier; using the first key, partially decrypt the first data structure; storing the partially decrypted first data structure; and selectively storing a copy of the second data structure based on whether content of the first data structure corresponds to content of the second data structure.

15 Claims, 11 Drawing Sheets

(51) Int. Cl.
*H04L 9/32* (2006.01)
*H04L 9/40* (2022.01)
(52) U.S. Cl.
CPC ........ *H04L 9/3271* (2013.01); *H04L 63/0435* (2013.01); *H04L 63/0478* (2013.01); *H04L 63/123* (2013.01); *G06F 21/107* (2023.08); *G06F 2221/2115* (2013.01); *G06F 2221/2141* (2013.01)
(58) Field of Classification Search
CPC ............ H04L 63/123; G06F 21/10; G06F 2221/0753; G06F 2221/2115; G06F 2221/2141; H04N 21/23116; H04N 21/2747; H04N 21/23895; H04N 21/2181; H04N 21/4113; H04N 21/25816; H04N 21/4367; H04N 21/8352; H04N 21/2351; H04N 21/4126; H04N 21/2347; H04N 21/4627; H04N 21/42684; H04N 21/63775; H04N 21/2183; H04N 21/64715; H04N 21/23106; H04N 21/2743; H04N 21/26613; H04N 21/278; H04N 21/2323; H04N 21/222; H04N 21/2541; H04N 21/43853; H04N 21/4408; H04N 21/25875; H04N 21/4405; H04N 21/63345; H04N 21/4353
See application file for complete search history.

(56) References Cited

U.S. PATENT DOCUMENTS

| 2009/0208016 | A1* | 8/2009 | Choi ................... H04L 9/0825 380/277 |
| 2011/0125771 | A1* | 5/2011 | Gladwin .............. G06F 3/0619 709/219 |
| 2011/0161680 | A1* | 6/2011 | Grube ..................... G06F 21/64 713/193 |
| 2013/0305039 | A1* | 11/2013 | Gauda ................ G06F 21/6218 713/153 |
| 2014/0279958 | A1* | 9/2014 | Huang ................ G06F 16/1748 707/692 |
| 2015/0121417 | A1 | 4/2015 | Vince |
| 2015/0186403 | A1* | 7/2015 | Srivastava ........... G06F 16/215 707/692 |
| 2017/0006018 | A1 | 1/2017 | Campagna et al. |
| 2018/0013562 | A1 | 1/2018 | Haider et al. |
| 2020/0057752 | A1* | 2/2020 | Tofano ................. G06F 16/215 |
| 2020/0259636 | A1* | 8/2020 | Gottipati .............. H04L 9/0861 |
| 2020/0320046 | A1* | 10/2020 | Narayanamurthy .. G06F 3/0641 |
| 2021/0056223 | A1* | 2/2021 | Hetzler .............. G06F 21/6227 |

OTHER PUBLICATIONS

Nathalie Baracaldo et al., "Reconciling End-to-End Confidentiality and Data Reduction In Cloud Storage," Cloud Computing Security, ACM, 2 Penn Plaza, Suite 701 New York NY 10121-0701 USA, Nov. 7, 2014 (Nov. 7, 2014), pp. 21-32 (13 pages).
Sabrina De Capitani di Vimercati et al., "Practical Techniques Building on Encryption for Protecting and Managing Data in the Cloud," Mar. 18, 2016 (Mar. 18, 2016), Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Le (35 pages).
Bushra AlBelooshi et al., "Securing Cryptographic Keys in the Cloud: A Survey," IEEE Cloud Computing, IEEE, USA, vol. 3, No. 4, Jul. 1, 2016 (Jul. 1, 2016), pp. 42-56 (15 pages).

* cited by examiner

CONTENT RECOGNITION SYSTEMS AND METHODS FOR ENCRYPTED DATA STRUCTURES

TECHNICAL FIELD

The present disclosure relates generally to systems and methods for storing encrypted data structures, and more particularly, to systems and methods for dynamic recognition of content in encrypted data structures.

BACKGROUND

Direct to home (DTH) broadcasting occurs when content providers that transmit using satellites (such as satellite television or satellite radio), and digital terrestrial television (DTT) broadcasting occurs when content providers that transmit digital television over the air with broadcast towers. Combined with cable broadcasts (e.g., using auxiliary cables to cable boxes), these technologies remain a primary source for content distribution to consumers.

In addition to DTH, DTT, and cable, over the top (OTT) services include multimedia content providers that stream content directly to viewers over the Internet, bypassing telecommunications, multichannel television, and broadcast television platforms that traditionally act as a content controller or distributor. Users have widely embraced OTT services, such as web-based video on demand services, as alternatives to traditional multimedia platforms.

Developers and broadcasters have turned to dynamic rights management (DRM) techniques to securely distribute content using OTT services. For example, an application on a user device, such as a smart phone, laptop, or the like may use a key, certificate, or other encryption protocol to receive copyrighted content and decode the same for playback. Moreover, some OTT services may allow for non-transitory storage of copyrighted content on the user device for offline playback.

Existing encryption techniques, however, face important challenges that limit the flexibility of storing content transmitted using DTH, DTT, and cable technology. First, user devices are often not allowed to transmit or store the copyrighted content without encryption. For example, users may retain the key, certificate, or other encryption protocol on the user device to prevent a third party from obtaining unauthorized access to the contents of the encrypted content. However, this leads to redundancies if the user stores the copyrighted content remotely, e.g., using a cloud service or the like. In particular, the remote storage must store each and every user's copy of the copyrighted content in full because the remote storage is unable to determine overlapping content. Second, transmitting copyrighted content increases security risks. For example, transmitting copyrighted content transmitted with a single key risks interception on a network followed by decryption from a bad actor. Therefore, traditional encryption mechanisms result in vulnerabilities and redundancies for copyrighted content.

These challenges are also present for content from OTT systems or when DTH, DTT, or cable technologies cooperate with OTT systems for upload and remote storage of content. For example, the same redundancies and vulnerabilities occur if copyrighted content from an OTT system is uploaded to a remote storage.

The disclosed systems and methods for recognition, storage, and transmission of encrypted data structures address one or more of the problems set forth above and/or other problems in the prior art.

SUMMARY

One aspect of the present disclosure is directed to a system for maximizing storage of encrypted content in a storage system including one or more processors; and a storage medium storing instructions. When executed by the one or more processors, the instructions enable the system to perform operations including: receiving, from a first client device, a first data structure encrypted commutatively with a first key and a common key, wherein the one or more processors do not have access to the common key; receiving the first key and a first segment identifier; receiving, from a second client device, a second data structure encrypted commutatively with a second key and the common key; receiving, from the second client device, a second segment identifier; using the first key, partially decrypting the first data structure; storing the partially decrypted first data structure; and selectively storing a copy of the second data structure based on whether content of the first data structure corresponds to content of the second data structure.

Another aspect of the present disclosure is directed to a system for uploading encrypted data structures to a remote storage including one or more processors; and a storage medium storing instructions. When executed by the one or more processors, the instructions enable the system to perform operations including: receiving a license to access a first data structure, the first data structure encrypted with a first key; obtaining a common key; further encrypting the first data structure commutatively using the common key without decrypting the first data structure using the first key; and transmitting, to a remote device, the further encrypted first data structure along with the first key, wherein the remote device does not have access to the common key.

Yet another aspect of the present disclosure is directed to a system for receiving encrypted data structures from a remote storage including one or more processors; and a storage medium storing instructions. When executed by the one or more processors, the instructions enable the system to perform operations including: sending, to a remote device, a request for an encrypted data structure along with at least one of proof of access to the data structure or a license to access the data structure; in response to the request and from the remote device, receiving the encrypted data structure, wherein the data structure is encrypted with a first key and a common key, the common key accessible by the system and not by the remote device; accessing the first key; accessing the common key; and decrypting the received data structure using the first key and the common key.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
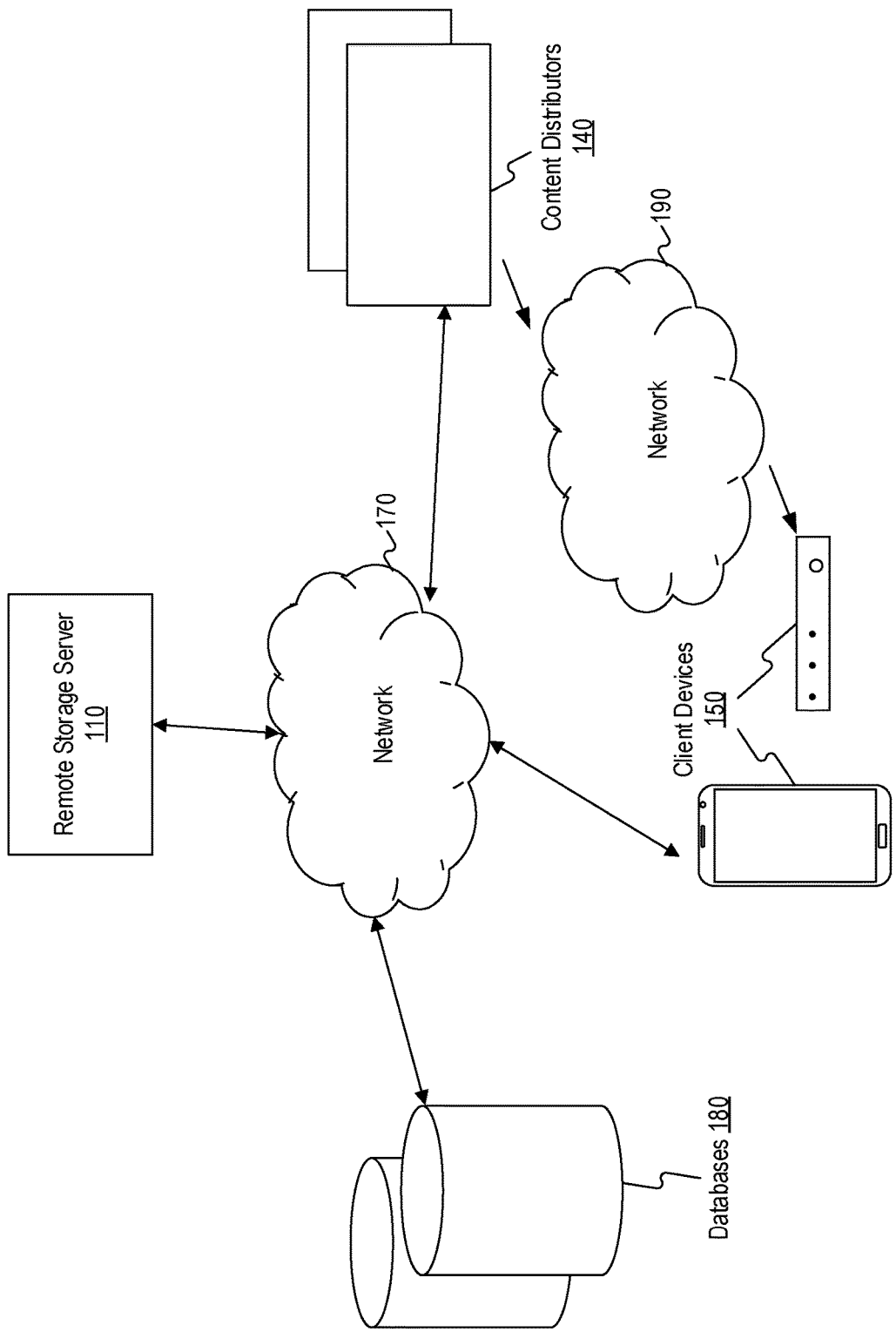
FIG. 1 is a block diagram of an exemplary system, consistent with disclosed embodiments.

The disclosure is generally directed to systems and methods that optimize storage space by recognizing shared content in encrypted data structures as well as store and/or distribute the same to client devices. In some embodiments, the disclosed systems and methods improve flexibility and security for copyrighted content by enhance communication security when transmitting copyrighted content. For example, the disclosed systems and methods may use double encryption when copyrighted content is transmitted to avoid a reasonable possibility of decryption by an intercepting actor. Moreover, the double encryption allows for transmission of one of the encryption keys with the content without risk of sharing the decrypted content. Moreover, the disclosed systems and methods may withhold transmission of at least one of the necessary keys to retain benefits provided by double encryption and allow for single encryption storage once the encrypted content is received. Further, the disclosed systems and methods may also increase flexibility by enabling a remote service to detect overlaps in copyrighted content without decryption, the disclosed systems and methods can also be easily integrated with existing content delivery infrastructure, whether DTH, DTT, or cable transmission; OTT infrastructure; or other multimedia delivery.

Although described above and below using double encryption, embodiments of the present disclosure may use any number of keys for encryption. For example, a client device may use additional keys to provide additional layers of encryption before sending a data structure (as well as the additional keys) to a remote storage. Additionally or alternatively, the remote storage may apply one or more keys local to the remote storage when storing encrypted content.

Multimedia content is frequently transmitted to client devices as data structures. In this description, data structures may refer to, for example, content segments (such as HLS segments), information chunks (such as PNG, IFF, MP3 and/or AVI files), and/or media fragments (including, among others, URI fragments, URI queries, HTML5 fragments, and/or CSS3 fragments) etc.

To prevent the unauthorized access to these data structures, existing systems, such as OTT infrastructure or cable networks, apply encryption such that only client devices (e.g., smart phones, tablets, laptops, cables boxes, or the like) having a particular key may decrypt the data structures and view the content therein. For example, the encryption may comprise asymmetric encryption such that the private key used by the client device to decrypt is distinct from the public key used by a content distributor to encrypt the data structures. In other embodiments, the encryption may comprise symmetric encryption such that the key used by the client device to decrypt is the same key used by the content distributor to encrypt the data structures.

Remote storages, such as cloud services, may not store cleartext versions of content without violating copyright of the content. However, this results in numerous redundancies if multiple users store overlapping copyrighted content on the remote storages because the remote storage includes multiple copies of the overlapping content encrypted differently. To solve these technical problems, the disclosed methods and systems enable recognition of overlapping content in individually encrypted data structures. Thus, a remote storage may determine overlap in encrypted content without having access to the cleartext content, which may be copyrighted. For example, some embodiments of the disclosed methods include generating a common key for use by client devices in further encrypting already-encrypted content, whose cleartext version may be copyrighted. The remote storage lacks access to the common key (or to the private key of a common key pair in embodiments using asymmetric encryption). Accordingly, the key is common because multiple client devices may have access to the key while the remote storage lacks access. In embodiments where the common key comprises the private key of a key pair, the remote storage may have access to the public key but does not have access to the private key, which is shared amongst client devices.

Because, in some embodiments, client devices may encrypt the already-encrypted data structures with the common key, the common key may be configured for commutative application with the keys typically used by the client devices for viewing the copyrighted content. In such embodiments, the common key and/or the keys (whether one, two, or any number of keys) typically used by the client devices may comprise self-inverses. Additionally or alternatively, the common key and the keys typically used by the client devices may provide homomorphic encryption such that the remote storage may perform one or more operations (such as hash verification or calculation of a segment identifier using a hash) on the data structures without decrypting the same. Regardless of whether one or more of the keys are self-inverses, client devices may provide the individual keys typically used to the remote storages, but not the common key, ensuring that the client devices do not compromise security of the copyrighted content. The remote storage may then recognize overlapping content because it may remove encryption with the keys typically used by the client devices but does not have access to the common key (or to a private key of a common key pair in embodiments using asymmetric encryption).

Therefore, while allowing for storing of copyrighted content on a remote storage, some embodiments of the disclosed systems and methods still allow for security of the copyrighted content, taking advantage of commutative encryption technology. Thus, the disclosed systems and methods provide a scalable and affordable method that can be easily integrated into existing content delivery infrastructure while reducing redundancy on remote storages. Further, in some embodiments, the double encryption that allows the secure, remote storage of copyrighted content may increase security during transmission of the same. In addition, some embodiments may include additional layers of encryption using keys local to client devices and/or to remote storages.

Including two or more layers of encryption increases the difficulty of brute force attacks or other attempts to intercept and decrypt the content.

The disclosed systems and methods may be applicable to multiple content delivery schemes and may be adaptable to different delivery infrastructures. For example, the disclosed systems and methods can be used with multiple encoding, encryption, and packaging technologies. In some embodiments, the disclosed methods may be applied to constant Bitrate (CBR), adaptive bitrate (ABR) and variable bitrate (VBR) encodings. Moreover, the disclosed methods may be employed with multiple packaging technologies such as Common Media Application Format (CMAF), MPEG-DASH, HTTP Live Streaming (HLS), among others. Further, the disclosed systems and methods may be independent of the streaming mode used by the client. For example, the disclosed systems and methods may apply to any received or stored data structures subject to encryption, e.g., on account of a license required because the data structures include copyrighted content. Moreover, the disclosed systems and methods can be integrated with any DRM solution and remote storage services and does not require proprietary software development kit (SDK) or other integration on the client platform and the remote storage.

Further, to reduce exposure of copyrighted information in transmission or storage, the disclosed systems and methods may use hardware and/or software isolation on a client device such that a portion of the client device encrypting a data structure including the copyrighted information with a common key is isolated from a portion of the client device decrypting the data structure including the copyrighted information using a first key, e.g., associated with a DRM license. Further, in such embodiments, the disclosed systems and methods may prevent all portions of the client device not using the first key (e.g., all portions not used for consumption of the copyrighted information by the user) from accessing a cleartext version of the data structure.

The disclosed systems and methods improve the technical field of storing content (e.g., multimedia content, images, text, or the like) remotely and solve technical problems associated with redundancies in storing encrypted data structures. In some embodiments, the disclosed systems and methods modify the conventional operation of client devices and remote storages with an encryption scheme that avoids revealing cleartext data structures but also permits recognition of overlapping content from different client devices. Thus, the disclosed methods and systems may improve the efficiency of the remote storages by reducing redundant storages. The arrangement in the disclosed system may improve the resource utilization and minimize computer expenditures. These features not only result in more efficient systems that improve storage of content, they also enhance user experience.

Reference will now be made in detail to the disclosed embodiments, examples of which are illustrated in the accompanying drawings.

FIG. 1 is a block diagram of an exemplary system 100, consistent with disclosed embodiments. In system 100, a content distributor 140 may comprise a DTH transmitter, DTT transmitter, cable service, or any other content delivery service using a one-way network, such as network 190, to provide copyrighted content included in one or more data structures to clients (e.g., via client devices 150). Additionally or alternatively, content distributor 140 may comprise an OTT service using a two-way network, such as network 170, to provide copyrighted content included in one or more data structures to clients (e.g., via client devices 150).

Databases 180 may include one or more computing devices configured with appropriate software to perform operations consistent with providing remote storage server 110 data for performing transactions with client devices 150. Databases 180 may include, for example, Oracle™ databases, Sybase™ databases, or other relational databases or non-relational databases, such as Amazon Web Services™ (AWS) S3, Dynamo™ DB, Hadoop™ sequence files, HBase™, or Cassandra™. Databases 180 may include computing components (e.g., database management system, database server, etc.) configured to receive and process requests for data stored in memory devices of the database(s) and to provide data from the database(s).

While databases 180 are shown separately, in some embodiments databases 180 may be included in, or otherwise related to, remote storage server 110. Databases 180 may be configured to collect and/or maintain the data uploaded by users from client devices 150. For example, databases 180 may store data structures uploaded by users via remote storage server 110 and/or via content distributors 140. Thus, databases 180 may collect the data from a variety of sources, including, for instance, content distributors 140 and/or remote storage server 110.

Client devices 150 may include a set-top box (STB) or set-top unit (STU) configured to perform one or more operations consistent with disclosed embodiments. For example, client devices 150 may receive content from content distributors 140 over one-way network 190 or two-way network 170 using an integrated receiver, such as a digital video recorder (DVR) or personal video recorder (PVR), and generate and display content in interfaces via display devices included in client devices 150. For example, client devices 150 may communicate with a display (such as a television or monitor) to output content received from content distributors 140.

Additionally or alternatively, client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may be configured for wired and/or wireless communications and may include software that when executed by a processor performs internet-related communication (e.g., TCP/IP) and content display processes. For instance, client devices 150 may execute browser software that generates and displays interfaces including content on a display device included in, or connected to, client devices 150. Client devices 150 may execute applications that allow client devices 150 to communicate with content distributors 140 over two-way network 170 or one-way network 190, and generate and display content in interfaces via display devices included in client devices 150. For example, client devices 150 may display a media player to output content received from content distributors 140.

Whether comprising STBs and STUs or computing devices, client devices 150 may further execute applications that allow client devices 150 to communicate with components over network 170, and upload content to and download content from remote storage server 110. For example, client devices may display a cloud interface to provide for uploads to and downloads from remote storage server 110. Client devices 150 are further described in connection with FIG. 2B.

System 100 may include a remote storage server 110. Remote storage server 110 is further described in connection with FIG. 2A. In one configuration, remote storage server 110 may include one or more computing systems configured to perform operations consistent with handling content uploads from client devices 150 as well as content downloads to client devices 150. In some embodiments, remote storage server 110 may receive encrypted content from client devices 150, where the cleartext version of the encrypted content is copyrighted. For example, client devices 150 may request to upload encrypted data structures whose cleartext versions include a movie, a TV show, a song, a book, or the like, e.g., using an HTTP request, an FTP request, or the like. Remote storage server 110 may provide infrastructure and components to receive the uploaded resource and securely store the same on behalf of client devices 150. In such embodiments, remote storage server 110 may verify that the user of client devices 150 has adequate authorization to remotely store encrypted versions of the content (e.g., by verifying a license associated with DRM technology, verifying proof to access the content, or the like). Further, remote storage server 110 may resolve the identity of client devices 150 (e.g., as a serial number, a universally unique identifier (UUID), a username, a certificate, an Internet protocol (IP) address, or the like) to store the encrypted content in associated with particular client devices 150.

In some embodiments, remote storage server 110 may prepare elements of system 100 for remote storage of encrypted content whose cleartext version is copyrighted. For example, remote storage server 110 may instruct client devices 150 to use a common key—which may allow for commutative encryption with the encryption from one or more other keys used by client devices 150 used by client devices 150 to encrypt the copyrighted content—that is used to keep uploaded content secret from remote storage server 110. For example, the common key may be accessible by client devices 150 but not remote storage server 110 through a key distribution center (KDC) or any other system distributing the common key to client devices 150 or may be derived by client devices 150 using any key determining or generating technique. Additionally or alternatively, the common key may be used in asymmetric encryption technology such that the common key comprising the private key of a key pair and is only accessible or provided to client devices 150. In such embodiments, the public key of the key pair may also be accessible to client devices 150 for encryption and optionally to remote storage server 110 because remote storage server 110 may not decrypt information using the public portion of the common key. In such embodiments, as further described below in connection with FIGS. 3A and 3B, client devices 150 may provide the key used by client devices 150 to encrypt the copyrighted content to remote storage server 110. Accordingly, remote storage server 110 may partially decrypt content from client devices 150, identify corresponding content, and reduce redundant storage. For example, a "partial decryption" may comprise removing one or more layers of encryption from one or more keys while leaving one or more additional layers of encryption from one or more additional keys. Remote storage server 110 still cannot access fully decrypted content on account of its lack of access to the common key used by client devices 150 for double encryption. Some embodiments may include additional layers of encryption from client devices 150 and/or from remote storage server 110.

FIG. 1 shows client devices 150 connected to remote storage server 110 using two-way network 170. In such embodiments, client devices 150 may transmit keys used by client devices 150 to encrypt copyrighted content separately in time (e.g., using separate ports on network 170, using separate upload protocols such as HTTP rather than FTP or the like, using different packet groups sent at different times, or the like). Additionally or alternatively, client devices 150 may connect to remote storage server 110 using one or more additional networks that are at least partially distinct from two-way network 170. For example, client devices 150 may use a cellular connection (e.g., using long-term evolution (LTE), 4G, or the like) in addition to a wired connection (e.g., using ethernet or the like) and/or a different wireless connection (e.g., using a WiFi protocol, a Bluetooth® protocol, or the like). Although these networks may share components (e.g., using the same Internet backbone), they may still be at least partially distinct, as explained above. In another example, client devices 150 may upload the keys using a different route of servers on the Internet or other computer network than used for uploading the encrypted content whose cleartext version includes copyrighted content.

In some embodiments, as shown in FIG. 1, components of system 100 may be connected to a two-way network 170. Moreover, as shown in FIG. 1, other components of system 100 may additionally or alternatively be connected to a one-way network 190. However, in other embodiments components of system 100 may be connected directly with each other, without networks 170 or 190. For example, databases 180 may be directly coupled to remote storage server 110.

FIG. 1 shows client devices 150 as singular devices. However, client devices 150 may be implemented as combinations of different devices. For example, elements in one of client devices 150 may be embodied in an STB or STU, such as a cable box, communicating with a user computing device, such as a laptop or desktop. Additionally or alternatively, FIG. 1 shows remote storage server 110 separate from database(s) 180; however, remote storage server 110 and database(s) 180 may be implemented on a single server or server rack. For example, elements in database(s) 180 may be embodied in one or more non-transitory media forming part of remote storage server 110.

Two-way network 170 may be any type of network configured to provide communications between components of system 100. For example, network 170 may be any type of network (including infrastructure) that provides communications, exchanges information, and/or facilitates the exchange of information, such as the Internet, a Local Area Network, or other suitable connection(s) that enables the sending and receiving of information between the components of system 100. One-way network 180 may be any type of network configured to allow one component of system 100 to broadcast information to another component of system 100. For example, network 180 may be any type of network (including infrastructure) that provides frequency bands or other means of transmission for content to move from a broadcaster (such as content distributors 140) to receivers (such as client devices 150). In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope and spirit of the disclosed embodiments.

Figure 2A:
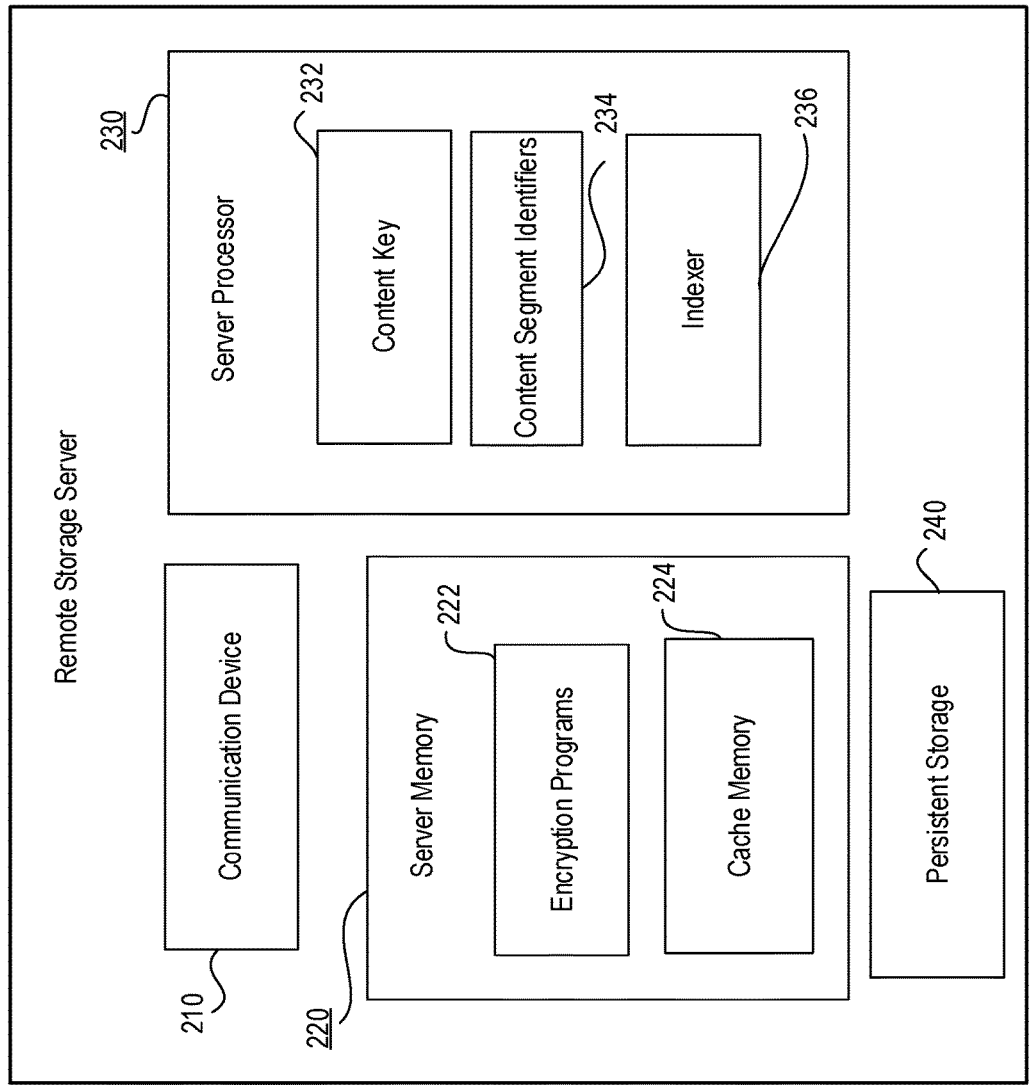
FIG. 2A is a block diagram of an exemplary remote storage, consistent with disclosed embodiments.

FIG. 2A shows a block diagram of a remote storage server 110 (FIG. 1), consistent with disclosed embodiments. Remote storage server 110 may include a communication device 210, a server memory 220, a server processor 230, and a persistent storage 240. Server memory 220 may include encryption programs 222 and cache memory 224. As shown in FIG. 2A, server processor 230 includes a content key 232, a content segment identifier 234, and an indexer 236, although these elements may be stored in server memory 220 and utilized by server processor 230 during operation.

In some embodiments, remote storage server 110 may take the form of a server, a general purpose computer, a mainframe computer, or any combination of these components. In other embodiments, remote storage server 110 may be a virtual machine. Other implementations consistent with disclosed embodiments are possible as well.

Communication device 210 may be configured to communicate with one or more databases, such as databases 180 (FIG. 1) described above, and other elements of system 100 either directly or via network 170. In particular, communication device 210 may be configured to receive data structures from client devices 150 (FIG. 1). Further, communication device 210 may be configured to receive user account information from client devices 150 to verify an identity of client device 150 before storing the data structures. Additionally or alternatively, communication device 210 or a separate communication device (not shown) may be configured to communicate with other components as well, including, for example, content distributors 140. For example, content distributors 140 may provide the data structures to remote storage server 110 via communication device 210 at the request of client devices 150, or content distributors 140 may transmit content to remote storage server 110 using HLS or other streaming methods using communication device 210 or a separate communication device (not shown).

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Server memory 220 may include one or more storage devices configured to store instructions used by server processor 230 to perform functions related to disclosed embodiments. For example, server memory 220 may store software instructions, such as encryption programs 222, that may perform operations when executed by server processor 230. The disclosed embodiments are not limited to separate programs or computers configured to perform dedicated tasks. For example, server memory 220 may include a single encryption program 222 that performs the functions of remote storage server 110, or encryption programs 222 may comprise multiple programs. Server memory 220 may also store cache memory 224 that is used to store encrypted content and/or for encryption programs 222. For example, cache memory 224 may include copies of encrypted content that have been received from client devices 150 but not yet indexed and stored. Additionally or alternatively, cache memory 224 may include copies of encrypted content retrieved from database(s) 180 before transmission to client devices 150. For example, with the encrypted content stored in cache memory 224, remote storage server 110 may quickly respond to user content requests. In such embodiments, locally storing encrypted content enables handling transactions without additional traffic and reduces latency.

In certain embodiments, server memory 220 may store sets of instructions for carrying out processes to partially decrypt content stored in cache memory 224, perform user authentication or verification tasks, and/or interact with databases 180 to store and index uploaded content as well as retrieve content to respond to user requests. In certain embodiments, server memory 220 may store sets of instructions for requesting content from content distributors 140 in response to user requests to store such content. Other instructions are possible as well. In general, instructions may be executed by server processor 230 to perform processes consistent with disclosed embodiments.

In some embodiments, server processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, server processor 230 may be a plurality of devices coupled and configured to perform functions consistent with the disclosure. For example, server processor 230 may include a plurality of co-processors, each configured to run specific remote storage server 110 operations such as floating point arithmetic, graphics, signal processing, string processing, cryptography, or I/O interfacing.

In some embodiments, server processor 230 may execute software to perform functions associated with each component of server processor 230. In other embodiments, each component of server processor 230 may be an independent device. In such embodiments, each component may be a hardware device configured to specifically process data or perform operations of processing transactions. For example, content key 232 and content segment identifiers 234 may be stored on processor cache or registers while indexer 236 may be a central processing unit (CPU) or a field-programmable gate array (FPGA). Other hardware combinations are also possible. In yet other embodiments, combinations of hardware and software may be used to implement server processor 230.

Content key 232 may comprise keys received from client devices 150 along with encrypted content. Content key 232 may allow encryption programs 222 to partially decrypt the received content. For example, encryption with content key 232 may commute with encryption with a common key such that the received content is double encrypted (or even further encrypted with additional content keys not shown in FIG. 2A). Accordingly, encryption programs 222 may partially decrypt the received content using content key 232 such that the partially decrypted content is still encrypted with the common key, to which remote storage server 110 lacks access. Additionally or alternatively, content key 232 may be stored in associated with (e.g., using an index of a relational database structure, using edges of a graphical database structure, or the like) the received or partially decrypted content.

Content segment identifiers 234 may comprise one or more data structures received from client devices 150 identifying content whose encrypted versions are received by remote storage server 110. Accordingly, content segment identifiers 234 may be extracted using any tool for the identification of data structures from client devices 150. For example, content segment identifiers 234 may identify content using a secure token, a hash, a cookie, or an equivalent technique for identification. Additionally or alternatively, content segment identifiers 234 may comprise a universally unique identifier (UUID), a certificate, or any other data structure identifying the content whose encrypted versions are received by remote storage serer 110. Additionally or alternatively, content segment identifiers 234 may be extracted using any tool for the verification of authorization by client devices 150 and/or users of those devices to upload particular content. For example, content segments identifiers 234 may be included in proof to access or a license to use particular data structures (e.g., the proof being a digital rights management (DRM) data structure such as a certificate or the like).

Indexer 236 may include one or more processors or software-implemented processes that identify portions of databases 180 assigned to (or otherwise associated with) content segment identifier 234. For example, communication device 210 may receive encrypted content from client devices 150. Using content segment identifier 234 associated with the received content, indexer 236 may determine if the content is stored in databases 180. If not available, remote storage server 110 may store a partially decrypted version of the received encrypted content in association with content segment identifier 234 (and optionally with content key 232). If available, remote storage server 110 may decline to store a new copy of the partially decrypted content. Optionally, remote storage server 110 may further index the exiting stored copy with content key 232. In such embodiments, storing a single copy of the content reduces storage redundancy.

In some embodiments, encryption programs 222 may further partially decrypt the received content in order to verify the partially decrypted content. For example, indexer 236 may verify the partially decrypted content against an available copy already associated with content segment identifier 234. Alternative, indexer 236 may verify the partially decrypted content against an expected hash signature or other identifier of integrity within a data file if there is no available copy already associated with content segment identifier 234.

The components of remote storage server 110 may be implemented in hardware, software, or a combination of both. For example, although one or more components of remote storage server 110 may be implemented as computer processing instructions embodied in computer software, all or a portion of the functionality of remote storage server 110 may be implemented in dedicated hardware. For instance, groups of GPUs and/or FPGAs maybe used to quickly process encrypted content in server processor 230.

Figure 2B:
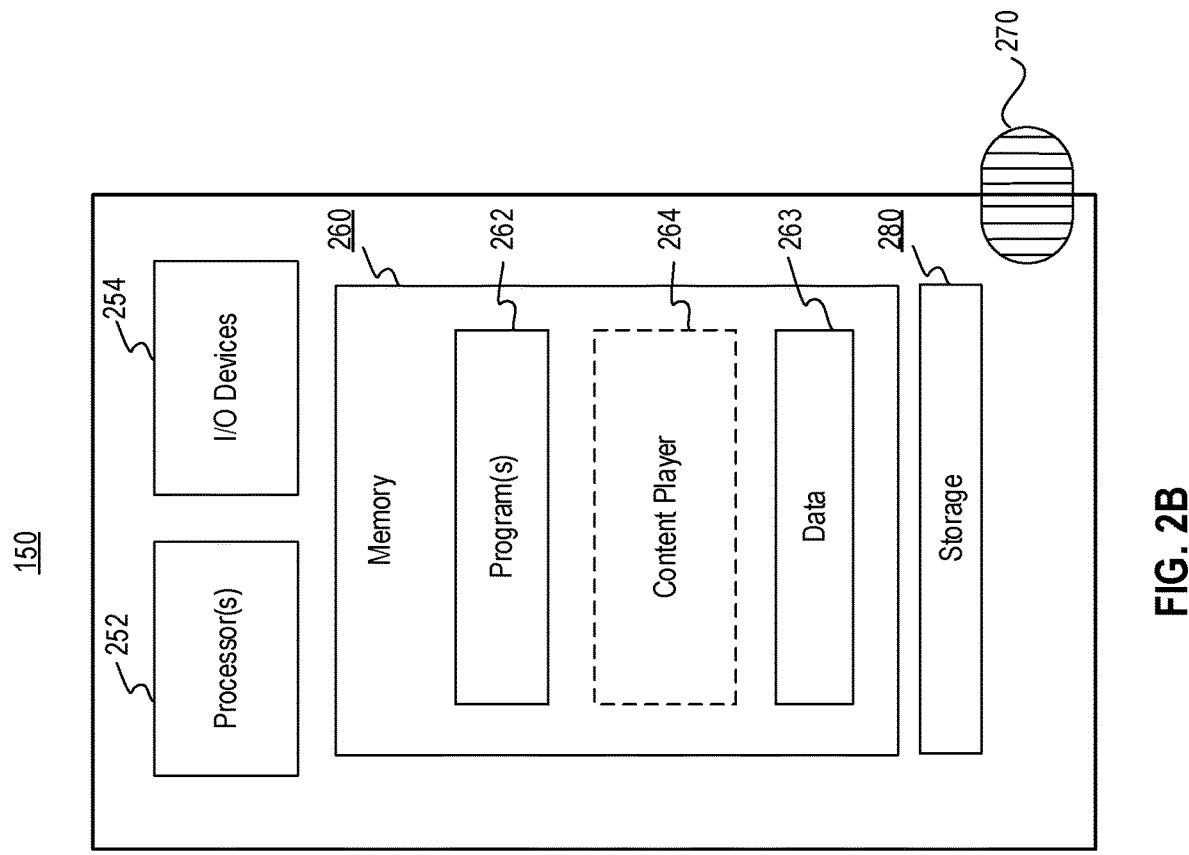
FIG. 2B is a block diagram of an exemplary client device, consistent with disclosed embodiments.

Referring now to FIG. 2B, there is shown a block diagram of an exemplary client device 150 (FIG. 1), consistent with disclosed embodiments. In one embodiment, client devices 150 may include one or more processors 252, one or more input/output (I/O) devices 254, one or more memories 260, and persistent storage 240 (e.g., a non-transitory storage medium such as flash memory, a hard disk drive, or the like). In some embodiments, client devices 150 may take the form of STBs, STUs, or any combination of these components. Accordingly, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. Additionally or alternatively, client devices 150 may take the form of smartphones, tables, general purpose computers, or any combination of these components. According to some embodiments, client devices 150 may comprise web browsers or similar computing devices that access web site consistent with disclosed embodiments.

Processor 252 may include one or more known processing devices, such as mobile device microprocessors manufactured by Intel™, NVIDIA™, or various processors from other manufacturers. The disclosed embodiments are not limited to any specific type of processor configured in client devices 150.

Memory 260 may include one or more storage devices configured to store instructions used by processor 252 to perform functions related to disclosed embodiments. For example, memory 260 may be configured with one or more software instructions, such as programs 262 that may perform operations when executed by processor 252. The disclosed embodiments are not limited to separate programs or computers configured to perform dedicated tasks. For example, memory 260 may include a single program 262 that performs the functions of the client devices 150, or program 262 may comprise multiple programs. Memory 260 may also store data 263 that is used for processing and/or displaying multimedia content. That is, memory 260 may include instructions to play multimedia in the client devices, upload encrypted content to remote storage server 110 (FIG. 1), and/or generate requests for content from remote storage server 110 and/or content distributors 140 (FIG. 1). Additionally or alternatively, content may be extracted from persistent storage 280 to memory 260 for processing and/or displaying.

In certain embodiments, memory 260 may store instructions for displaying multimedia content in client devices 150. For example, memory 260 may include a content player 264. Moreover, in some embodiments if content player 264 is not part of memory 260, client devices 150 may include programs 262 to download the applications required to view content and/or execute alternative media players to display the content. In addition, programs 262 may include client identification tools, such as secure cookies, to identify client devices 150 and/or users of client devices 150 and generate requests to remote storage server 110 and/or content distributors 140 including data structures for identifying the client and/or verifying permission to access requested content. Further content player 264 may be configured to perform automated operations, such as transmitting a decline message when a user is not authorized or verified to view requested content or upload content from player 314.

Although depicted as separate components, memory 260 and processor 252 may comprise integrated circuits for an STB, STU, or other content receiver. For example, memory 260 and professor 252 may comprise a DVR, a PVR, or any other electronic device configured to receive content (e.g., from content distributors 140 as shown in FIG. 1).

I/O devices 254 may include one or more devices configured to allow data to be received and/or transmitted by client devices 150 and to allow client devices 150 to communicate (e.g., via two-way network 170 of FIG. 1) with other machines and devices, such as other components of system 100. For example, I/O devices 254 may include a screen for displaying multimedia content or otherwise providing information to the user. I/O devices 254 may also include components for Internet communication or any other form of communication with components of system 100. I/O devices 254 may also include one or more digital and/or analog devices that allow a user to interact with client devices 150 such as a touch-sensitive area, buttons, or microphones. I/O devices 254 may also include other components known in the art for interacting with remote storage system 110 and content distributors 140.

In addition with or as an alternative to I/O devices 254, client devices 150 may also include a wired connection 270 (and/or corresponding wireless connection) to a one-way network (e.g., one-way network 190 of FIG. 1). For example, connection 270 may comprise an aux connection to a cable service, a wired connection to a satellite in a DTH system, a wired connection to an antenna in a DTT system, or any other connection for receiving content broadcast to client devices 150 (e.g., by content distributors 140 of FIG. 1).

The components of client devices 150 may be implemented in hardware, software, or a combination of both hardware and software, as will be apparent to those skilled in the art.

Figure 3A:
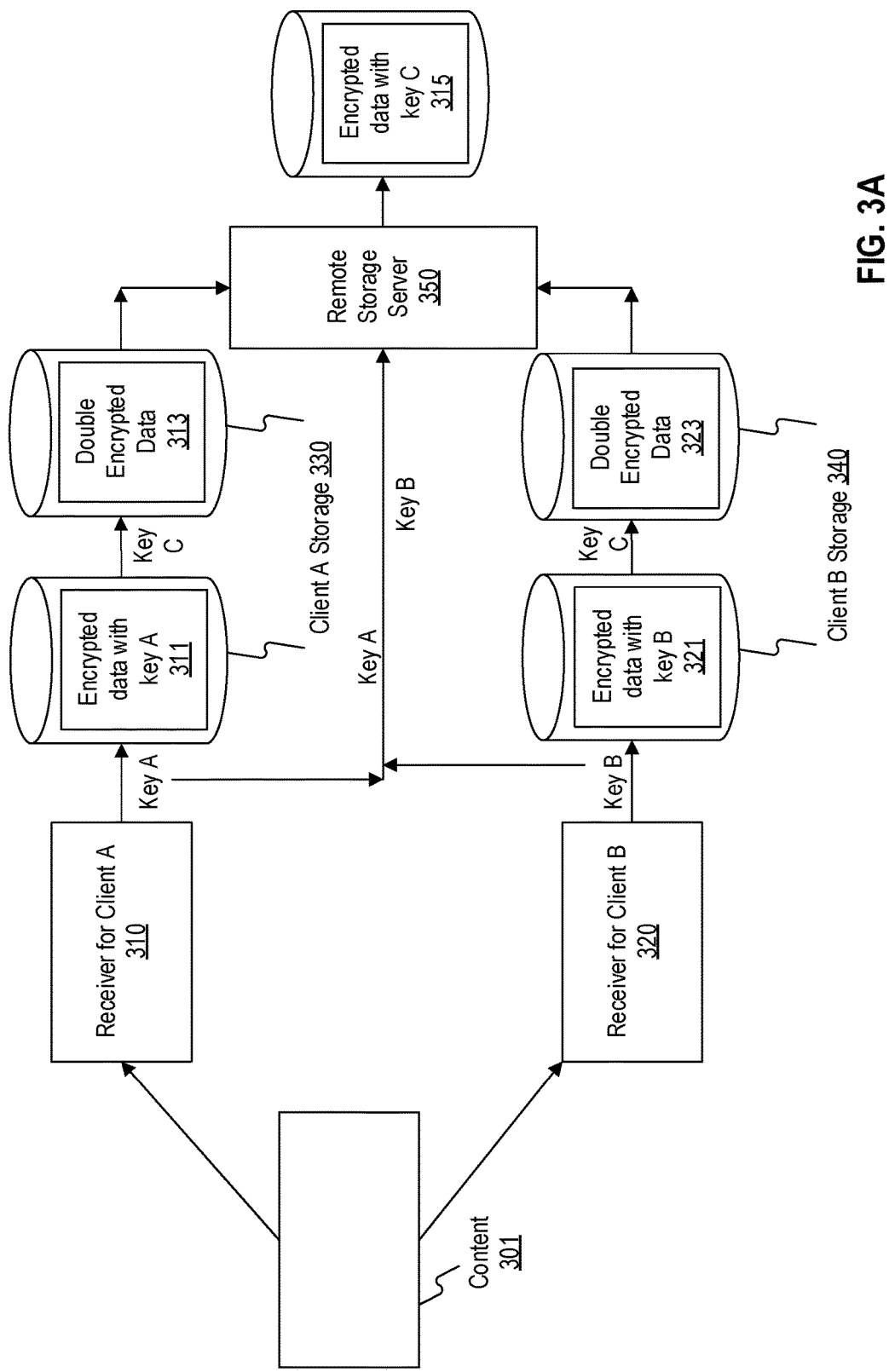
FIG. 3A is an exemplary schematic showing encrypted content storage, consistent with disclosed embodiments.

Referring now to FIG. 3A, there is shown a schematic of encrypted content storage, consistent with disclosed embodiments. As shown in FIG. 3A, process flow 300 may be implemented between at least one client (e.g., clients A and B) and elements of remote storage server 350 (remote storage server 110 of FIG. 1). In other embodiments, however, additional elements of system 100 (FIG. 1) can be incorporated to process flow 300. For example, content distributors 140 may perform some steps of process flow 300. Further, in some embodiments process flow 300 may be implemented by fewer elements of system 100, for example process flow 300 may be executed between remote storage server 350 (remote storage server 110 of FIG. 1) and a single client device 150 only.

As previously described in connection with FIG. 1, in some embodiments some steps not shown in process flow 300 may be performed before content 301 is delivered to clients A and B (e.g., via receivers 310 and 320, respectively). For example, client devices 150 for clients A and B may request content from content distributor 140 (e.g., via streaming, download, or the like). Additionally, in some embodiments, client devices 150 for clients A and B may provide identification information to content distributor 140. For example, client devices 150 for clients A and B may verify identities of the devices and/or users to content distributor 140. Further, content distributor 140 may provide proof of access to or a license to use the requested content as well as the content itself, which may be encrypted, in response to the request. As used herein, a proof of access may comprise proof that the requested content has been previously accessed by client devices 150 and/or proof that client devices 150 possess authority to access the content. Client devices 150 for clients A and B may already have received an encryption key (e.g., keys A and B, respectively) from content distributor 140 or may receive the encryption key with the content or with a license to the use the content, e.g., embedded in one or more DRM structures. Additionally or alternatively, client devices 150 for clients A and B may locally determine or generate keys A and B, respectively. These preparation steps, not shown in FIG. 3A, may be executed by system 100.

As depicted in FIG. 3A, client devices 150 for clients A and B may store encrypted copies 311 and 321 of content 301 in storages 330 and 340, respectively. For example, client devices 150 for clients A and B may store content 301 as encrypted by content distributor 140. In other embodiments, client devices 150 for clients A and B may store content 301 as decrypted and then re-encrypted using a different key by client devices 150 for clients A and B.

In order to store content 301 remotely without exposing cleartext versions of content 301 to unlicensed portions of client devices 150 as well as to network 170 and remote storage server 350 (remote storage server 110 of FIG. 1), client devices 150 for clients A and B may further encrypt copies 311 and 321, respectively, with a common key (e.g., key C). For example, the common key may be distributed to client devices 150 for clients A and B by a key distribution center (KDC) or any other system such that remote storage server 350 lacks access to key C. Because remote storage server 350 (remote storage server 110 of FIG. 1), or at least portions of server 350 (110 of FIG. 1) responsible for processing remote storage from clients A and B, lacks access to the common key, remote storage server 350 (remote storage server 110 of FIG. 1) cannot access cleartext versions of content 301.

In addition to uploading double encrypted copies 313 and 323, respectively, of content 301, client devices 150 for clients A and B may transmit their respective keys A and B to remote storage server 350 (remote storage server 110 of FIG. 1). Accordingly, remote storage server 250 (remote storage server 110 of FIG. 1) may determine that copies 313 and 323 encrypt overlapping content (e.g., by matching segment identifiers associated with copies 313 and 323) and store either copy 313 partially decrypted using key A or copy 323 partially decrypted using key B but not both in order to reduce redundancy. In some embodiments, remote storage server 350 (remote storage server 110 of FIG. 1) may further use the received keys A and B to partially decrypt copies 313 and 323 to verify content 301 without exposing cleartext versions of content 301.

Accordingly, as shown in FIG. 3A, remote storage server 350 (remote storage server 110 of FIG. 1) may thus store a single copy of content 301 encrypted with the common key (e.g., in databases 180 of FIG. 1) and indexed to the segment identifier. In some embodiments, remote storage server 350 may further index the single copy to an identifier for client A along with key A and to an identifier for client B along with key B.

Although not depicted in FIG. 3A, remote storage server 350 (remote storage server 110 of FIG. 1) may also re-distribute the copy of content 301 encrypted with the common key to client devices 150 for clients A and B. For example, in response to a request from client A, remote storage server 350 (remote storage server 110 of FIG. 1) may return the copy of content 301 encrypted with the common key. Additionally or alternatively, remote storage server 350 (remote storage server 110 of FIG. 1) may re-encrypt the copy with key A to return double encrypted data 313 and/or return key A along with the requested content. Similarly, in response to a request from client B, remote storage server 350 (remote storage server 110 of FIG. 1) may return the copy of content 301 encrypted with the common key. Additionally or alternatively, remote storage server 350 (remote storage server 110 of FIG. 1) may re-encrypt the copy with key B to return double encrypted data 323 and/or return key B along with the requested content.

Figure 3B:
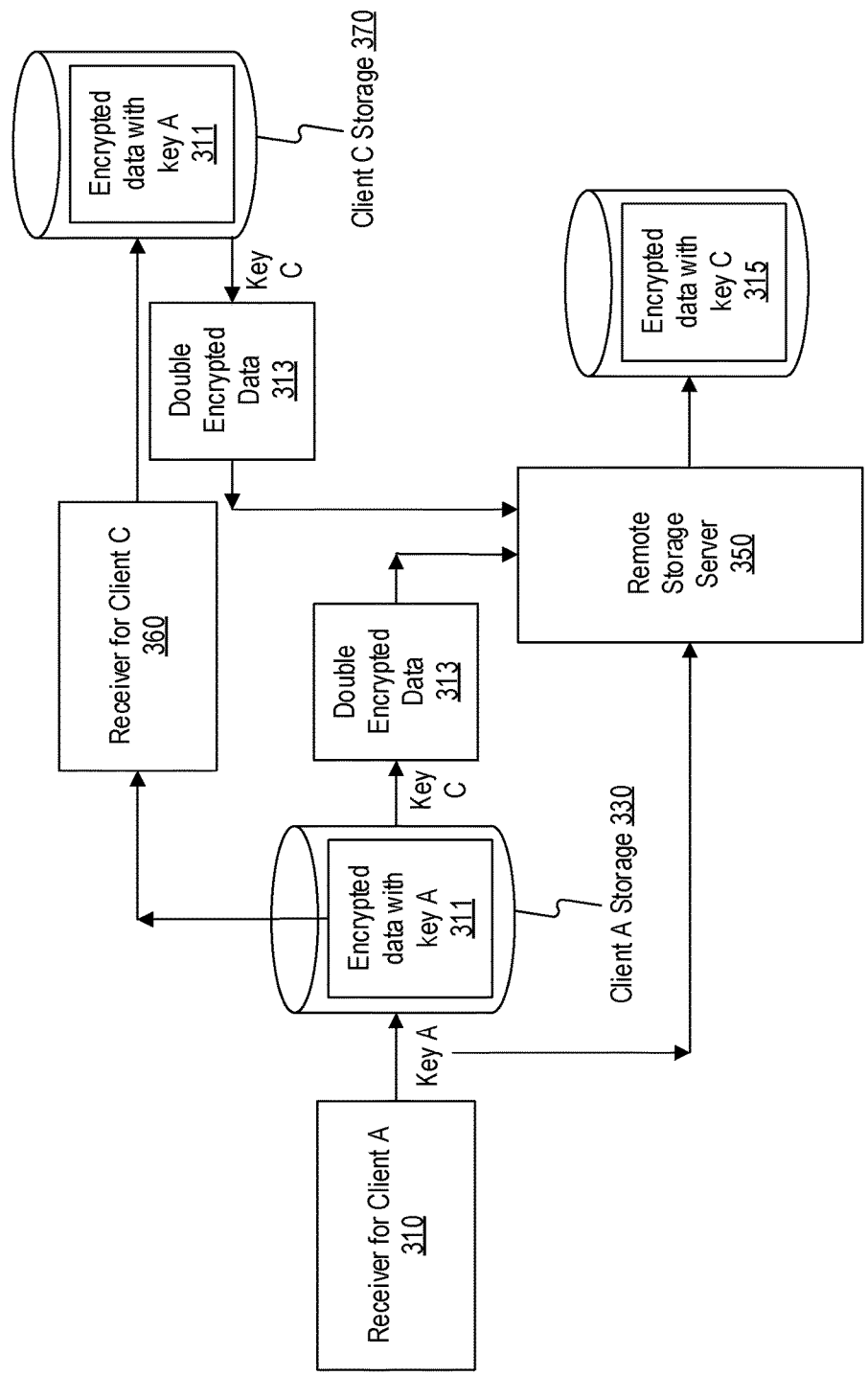
FIG. 3B is another exemplary schematic showing encrypted content storage, consistent with disclosed embodiments.

Referring now to FIG. 3B, there is shown another schematic of encrypted content storage, consistent with disclosed embodiments. FIG. 3B may, for example, represent an embodiment where client A of FIG. 3A has been divided (e.g., across hardware and/or across isolated software instances) into clients A and C. As shown in FIG. 3B, process flow 300 (e.g., as partially depicted in FIG. 3A) may allow for distribution of content 301 to third parties (e.g., client C) as well as remote storage server 350 (remote storage server 110 of FIG. 1) without exposing a cleartext version of content 301.

For example, as depicted in FIG. 3B, client device 150 for client A may further transmit copy 311 encrypted with key A to a receiver 360 for a client C. As long as client A does not transmit key A to client C (e.g., as client A does for remote storage server 350), client C may store copy 311 in storage 370 without having access to a cleartext version of content 301.

Moreover, as further depicted in FIG. 3B, client C may, in addition with or in lieu of client A, generate double encrypted data 313 and transmit the same to remote storage server 350 (remote storage server 110 of FIG. 1). Remote storage server 350 (remote storage server 110 of FIG. 1) may use the segment identifier associated with the content of double encrypted data 313 to identify redundancies because client C does not have access to key A and thus cannot provide key A to remote storage server 350 (remote storage server 110 of FIG. 1). Accordingly, client device 150 for client A may use client C to perform the storage. For example, the third party may comprise content distributors 140 transmitting a double encrypted copy 313 of content 301 to remote storage server 350 (remote storage server 110 of FIG. 1) on behalf of client A.

Although described with double encryption, the embodiments of FIGS. 3A and 3B may include additional layers of encryption from clients A, B, and/or C before uploading to remote storage server 350. Additionally or alternatively, the embodiments of FIGS. 3A and 3B may include additional layers of encryption from remote storage server 350 before storing.

Figure 3C:
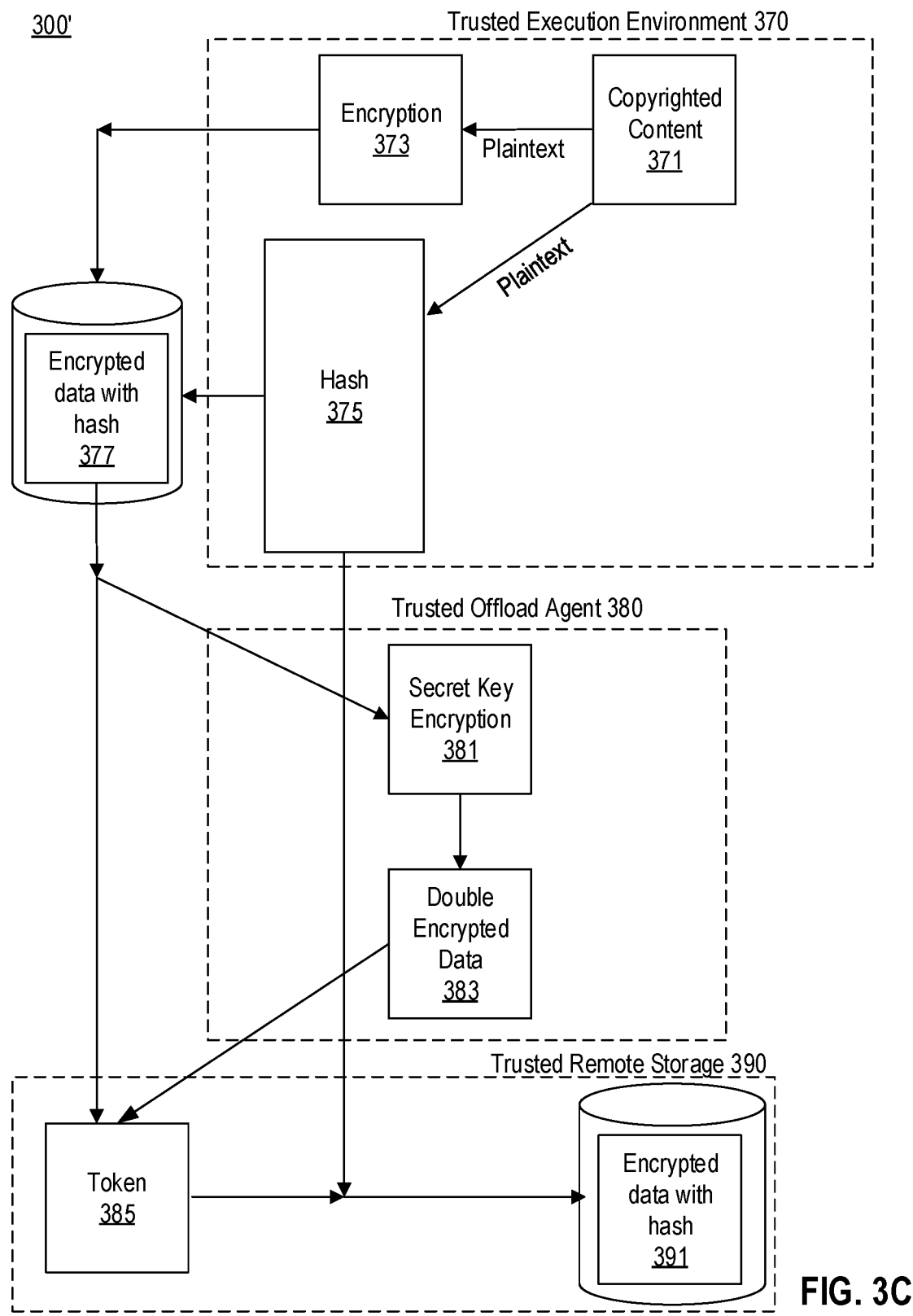
FIG. 3C is yet another exemplary schematic showing encrypted content storage, consistent with disclosed embodiments.

Referring now to FIG. 3C, there is shown a schematic of encrypted content storage, consistent with disclosed embodiments. As shown in FIG. 3C, process flow 300' may be implemented with a client device 150 (FIG. 1) divided into a trusted execution environment 370 and a trusted offload agent 380 as well as elements of trusted remote storage 390 (remote storage server 110 of FIG. 1). Trusted execution environment 370 and a trusted offload agent 380 may comprise isolated software instances on a client device 150. Additionally or alternatively, trusted execution environment 370 and a trusted offload agent 380 may comprise isolated hardware devices, such as a cable box and a laptop, a laptop and a smart phone, or the like.

In other embodiments, however, additional elements of system 100 (FIG. 1) can be incorporated to process flow 300'. For example, content distributors 140 may perform some steps of process flow 300'. Additionally or alternatively, process flow 300' may be executed between trusted remote storage 390 (remote storage server 110 of FIG. 1) and multiple client devices 150.

As previously described in connection with FIG. 1, in some embodiments some steps not shown in process flow 300' may be performed before content 371 is delivered to trusted execution environment 370. For example, trusted execution environment 370 of client device 150 may request content from content distributor 140 (e.g., via streaming, download, or the like). Additionally, in some embodiments, trusted execution environment 370 of client device 150 may provide identification information to content distributor 140. Further, content distributor 140 may provide proof of access to or a license to use the requested content as well as the content itself, which may be encrypted, in response to the request. Trusted execution environment 370 of client device 150 may already have received an encryption key (e.g., used by DRM decryption 373) from content distributor 140 or may receive the encryption key with the content. These preparation steps, not shown in FIG. 3C, may be executed by one or more components of system 100, such as content distributor 140.

As depicted in FIG. 3C, trusted execution environment 370 of client device 150 may store an encrypted copy 377 of content 371 in a local storage. For example, trusted execution environment 370 of client device 150 may use encryption 373 (which may comprise an encryption key local to trusted executed environment 370 and/or DRM or any other suitable method for accessing and/or viewing content from content distributor 140) or any other encryption mechanism that will commute with secret key encryption 381 (described below), to encrypt copyrighted content 371. In other embodiments, trusted execution environment 370 of client device 150 may store content 371 as already encrypted by content distributor 140 rather than re-encrypting using encryption 373. As further shown in FIG. 3C, trusted execution environment 370 may use hash 375 to generate a segment identifier associated with content 371.

In order to store an encrypted version content 371 remotely without exposing cleartext versions of content 371 to trusted offload agent 380 of client device 150 as well as to network 170 and trusted remote storage 390 (remote storage server 110 of FIG. 1), trusted execution environment 370 of client device 150 may provide encrypted copy 377 to trusted offload agent 380 without providing encryption 373 or any other decryption key or algorithm to trusted offload agent 380 of client device 150 (and optionally not providing hash 375). For example, trusted offload agent 380 may comprise an isolated software instance from trusted execution environment 370 not permitted to access portions of memory (such as memory 310 of FIG. 2B in embodiments where trusted execution environment 370 and trusted offload agent 380 comprise client device 150 of FIG. 2B) storing encryption 373 (and optionally hash 375). In other embodiments, trusted offload agent 380 may comprise a laptop, a smart phone, a desktop, or the like performing (or issuing commands to perform) upload of encrypted versions of content 371 to trusted remote storage 390 (remote storage server 110 of FIG. 1) while trusted execution environment 370 comprises a cable box, streaming device (e.g., a Chromecast®, a Roku®, or the like), or the like able to provide cleartext content 371 for consumption by a user of client device 150.

Thus, trusted offload agent 380 may use secret key encryption 381 on encrypted data 377 to generate double encrypted copy 383 of content 371, and trusted execution environment 370 may transmit a token 385 (or key or any other decryption algorithm) to trusted remote storage 390 (remote storage server 110 of FIG. 1). Optionally, as further shown in FIG. 3C, trusted execution environment 370 may transmit hash 375 to trusted remote storage 390 (remote storage server 110 of FIG. 1) for use in validating encrypted versions of content 371. Moreover, trusted execution environment 370 cannot decrypt double encrypted copy 383, and trusted offload agent 380 cannot decrypt either encrypted copy 377 or double encrypted copy 383. Accordingly, cleartext versions of content 371 are exposed to fewer hardware and software components than in existing systems, further increasing security and avoiding requirements to extend content rights to further hardware and/or software components. Although described using double encryption, trusted offload agent 380 and/or trusted execution environment 370 may apply additional encryption layers to content 371 before transmitting. In such embodiments, additional tokens (or keys or any other decryption algorithms) may be transmitted to trusted remote storage 390. Additionally or alternatively, trusted remote storage 390 may apply one or more additional encryption layers to the received data structures before storing.

Trusted remote storage 390 (remote storage server 110 of FIG. 1) may use the received token 385 to partially decrypt copy 383 and store a copy 391 encrypted with secret key encryption 381 but not token 385. In some embodiments, because secret key encryption 381 is used by multiple client devices 150 storing content on trusted remote storage 390, trusted remote storage 390 may determine when content from multiple client devices 150 corresponds and store fewer copies of overlapping content. Although trusted remote storage 390 may partially decrypt received content to determine correspondence, trusted remote storage 390 may also store the result of hash 375 with the single copy (shown as 391 in FIG. 3C). Accordingly, trusted remote storage 390 may use the result of hash 375 as a segment identifier to identify corresponding content without partial decryption. Moreover, because trusted remote storage 390 lacks access to secret key encryption 381, trusted remote storage 390 performs this determination without having access to cleartext versions of the content.

In embodiments where trusted remote storage 390 uses the result of hash 375 as a segment identifier to identify corresponding content without partial decryption, trusted remote storage 390 may still perform partial decryption of double encrypted data that corresponds to stored copy 391 in order to verify the integrity of the content that is encrypted therein. For example, trusted remote storage 390 may verify that neither stored copy 391 nor the received double encrypted data include corrupt or malicious data Although not depicted in FIG. 3C, trusted remote storage 390 (remote storage server 110 of FIG. 1) may also redistribute the copy 391 encrypted with secret key encryption 381 to trusted execution environment 370 of client device 150. For example, in response to a request from trusted execution environment 370, trusted remote storage 390 (remote storage server 110 of FIG. 1) may return the copy 391 encrypted with secret key encryption 381. Additionally or alternatively, trusted remote storage 390 (remote storage server 110 of FIG. 1) may re-encrypt the copy 391 with token 385 to return double encrypted data 383 and/or return token 385 along with the requested content. In order to remove secret key encryption 381, trusted execution environment 370 may request trusted offload agent 380 to partially decrypt copy 391 or double encrypted data 383 returned by trusted remote storage 390. In other embodiments, trusted remote storage 390 may return the copy 391 or double encrypted data 383 directly to trusted offload agent 380.

Figure 4:
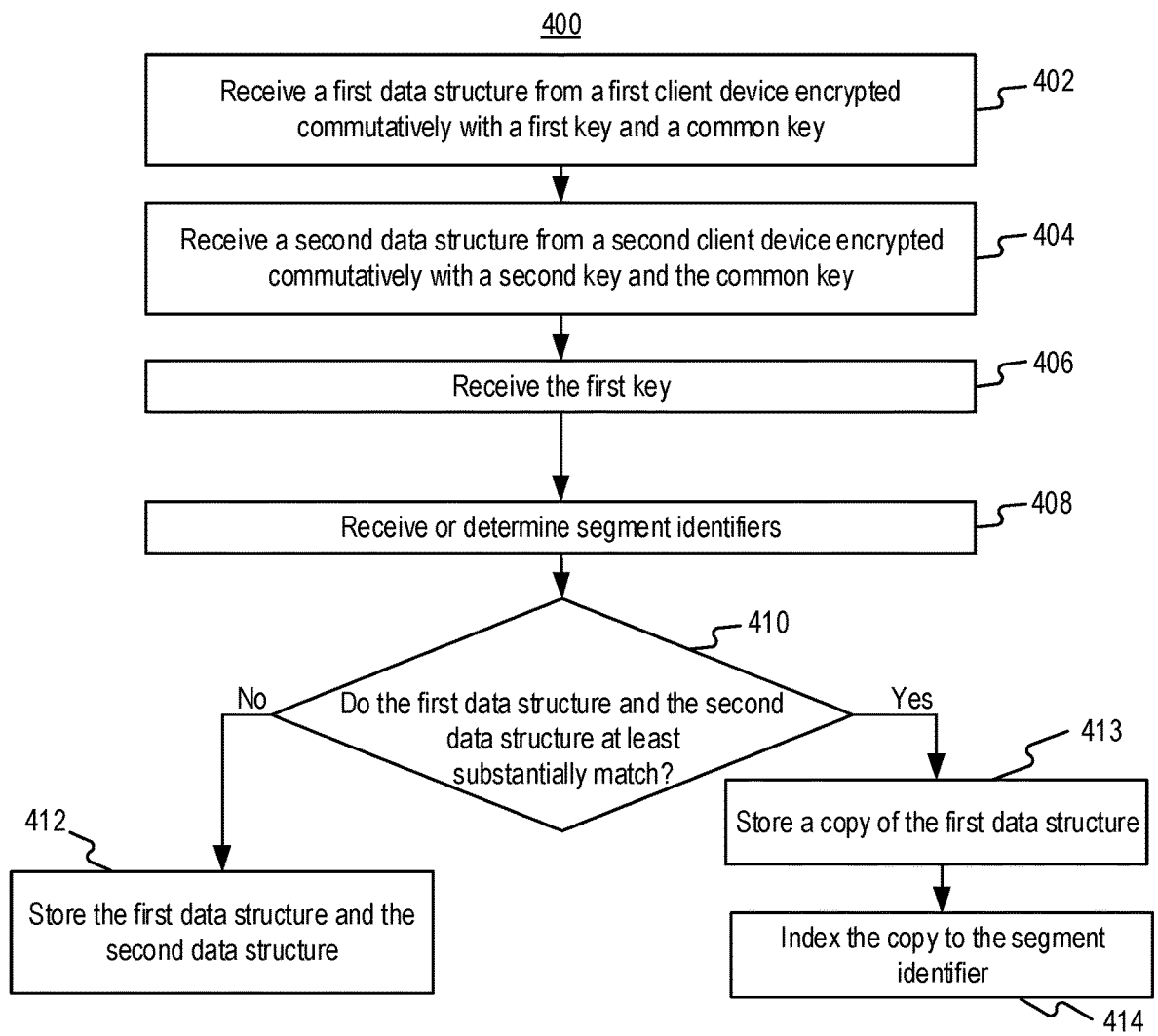
FIG. 4 is an exemplary flow chart illustrating recognition of overlapping content in encrypted data structures, consistent with disclosed embodiments.

Referring now to FIG. 4, there is shown a flow chart of an exemplary process 400 for maximizing storage of encrypted content in a storage system, consistent with disclosed embodiments. In some embodiments, recognition process 400 may be executed by remote storage server 110 (FIG. 1). For example, recognition process 400 may be performed by server processor(s) 230.

In step 402, remote storage server 110 may receive, from a first client device 150, a first data structure encrypted commutatively using a first key and a common key. Moreover, remote storage server 110 may not have access to the common key. For example, remote storage server 110 may receive double encrypted data structures including content (e.g., copyrighted content), and store them in a memory, such as cache memory 224. First client device 150 may have obtained the first data structure from content distributor 140, e.g., using HTTP Live Streaming (HLS), MPEG-DASH content delivery, FTP or HTTP downloading, or the like. In other embodiments, for example, first client device 150 may command content distributor 140 to double encrypt content to which first client device 150 has a license to access, bundle the encrypted content as the first data structure, and transmit the same to remote storage server 110. Although described as double encrypted, as explained above, the first data structure may include any number of layers of encryption.

In step 404, remote storage server 110 may receive, from a second client device 150, a second data structure encrypted commutatively using a second key and a common key. In some embodiments, the second key may comprise a key used by second client device 150 to decrypt the second data structure and access the content therein. In other embodiments, the second key may comprise a key secret to the second client device 150 and/or client distributor 140 (e.g., as depicted in FIG. 3C as token 385).

Moreover, remote storage server 110 may not have access to the common key. For example, remote storage server 110 may receive double encrypted data structures including content (e.g., copyrighted content), and store them in a memory, such as cache memory 224. Second client device 150 may have obtained the second data structure from content distributor 140, e.g., using HTTP Live Streaming (HLS), MPEG-DASH content delivery, FTP or HTTP downloading, or the like. In other embodiments, for example, second client device 150 may command content distributor 140 to double encrypt content to which second client device 150 has a license to access, bundle the encrypted content as the second data structure, and transmit the same to remote storage server 110. Although described as double encrypted, as explained above, the second data structure may include any number of layers of encryption.

In step 406, remote storage server 110 may receive the first key, e.g., from the first client device 150 or from a key distribution center (KDC) or any other system or mechanism for distributing and/or determining keys. For example, a request to store the first data structure may include the first key and originate from first client device 150 or from content distributor 140 at the command of first client device. In some embodiments, the first key may comprise a key used by first client device 150 to decrypt the first data structure and access the content therein. In other embodiments, the first key may comprise a key secret to the first client device 150 and/or client distributor 140 (e.g., as depicted in FIG. 3C as token 385).

In some embodiments, client device 150 and/or client distributor 140 may further provide a segment identifier used to identify the content encrypted as the first data structure. For example, as depicted in FIG. 3C, the segment identifier may comprise a hash of the content. Additionally or alternatively, any alphanumeric identifier (such as a UUID or a separate data structure comprising a certificate) may function as the segment identifier.

In step 408, remote storage server 110 may receive or determine segment identifiers associated with the content encrypted as the first data structure and the content encrypted as the second data structure. For example, remote storage server 110 may receive, from the second client device 150, a segment identifier associated with the content encrypted as the second data structure. In such embodiments, a request to store the second data structure may include the segment identifier and originate from second client device 150 or from content distributor 140 at the command of second client device. Additionally or alternatively, remote storage server 110 may determine one or more of the segment identifiers. For example, the segment identifier may comprise a hash of the content. Additionally or alternatively, any bitstring may be used as a segment identifier. For example, the bitstring may comprise an alphanumeric identifier (such as a UUID or a separate data structure comprising a certificate) may function as the segment identifier.

In some embodiments, as discussed above with respect to FIG. 3C, remote storage server 110 may receive the first data structure from a first portion of the first client device (e.g., trusted offload agent 780 of FIG. 3C) and the first key from a second portion of the first client device (e.g., trusted execution environment 770 of FIG. 3C). The first portion and the second portion may comprise distinct hardware components and/or distinct software components executed as isolated application instances. Additionally or alternatively, as discussed above with respect to FIG. 1, remote storage server 110 may receive the first data structure using a first computer network and the first key using a second computer network at least partially different from the first computer network.

As explained above, encryption with the first key and encryption with the second key may commute with encryption with the common key. In addition, in some embodiments, at least one of the first key, the second key, or the common key may comprise a self-inverse encryption key. Additionally or alternatively, asymmetric encryption may be used such that at least one of the first key, the second key, or the common key comprise public-private key pairs.

Steps 402-408 may allow remote storage server 110 to determine if there are data redundancies to be eliminated, which may be executed in subsequent steps. Although depicted in an order in FIG. 4, steps 402-408 may be executed in any order. Moreover, in some embodiments, the second data structure and/or second content identifier from step 404 may be received after the first data structure is stored (e.g., according to step 412 and/or 413). In step 410 remote storage server 110 may determine whether content of the first data structure corresponds to content of the second data structure. In some embodiments, remote storage server 110 may use the segment identifier determine if the content of the first data structure corresponds to content of the second data structure. For example, remote storage server 110 may check the received segment identifiers from the first client device and the second client device. Alternatively, remote storage server 110 may generate a hash or other segment identifier for the first data structure and/or the second data structure and check the same against each other. A match may comprise a complete match of the segment identifiers or a fuzzy match of the same. For example, a fuzzy match may comprise a threshold percentage (whether absolute or normalized relative to a size of the segment identifiers) of matching portions of the segment identifiers. Additionally or alternatively, a fuzzy match may use a threshold that varies depending on whether some or all portions of metadata (e.g., title, length, author, or the like) associated with the partially decrypted data structures are the same. In such embodiments, for example, matching portions of metadata may result in a lower threshold for fuzzy matching. Although described above with segment identifiers, any of the matching described above may be performed on a partially decrypted version of the first data structure and a partially decrypted version of the second data structure.

Another example of a fuzzy match may comprise mapping of timestamps such that portions of data structures that overlap are stored using a single copy while additional portions (e.g., on the front end or back end of a recording) are stored separately. Accordingly, remote storage server 110 may resolve ambiguity between start times, end times, and total time of recordings comprising the received data structures.

If remote storage server 110 determines there is no correspondence (step 410: no) remote storage server 110 may continue to step 412 and store both partially decrypted data structures. That is, when the content uploaded by the first client device and the second client device are different, remote storage server 110 may store the same separately. In addition, in step 412 remote storage server 110 may index the first data structure to an associated segment identifier (optionally with the first key) and index the second data structure to a different associated segment identifier (optionally with the second key). Thus, each client device 150 will only be permitted to request their corresponding data structure and key.

However, if in step 410 remote storage server 110 determines that there is correspondence (step 410: yes), remote storage server 110 may continue to step 413 and store a single copy of the content encrypted with the common key (e.g., encrypted copy 391 as shown in FIG. 1C). For example, remote storage server 110 may delete one of either the first data structure or the second data structure. In other embodiments, for example using a fuzzy search, remote storage server 110 may select one of either the first data structure or the second data structure as the single copy. In such embodiments, for example, remote storage server 110 may select a longer (in time, page length, or the like) one of the first data structure or the second data structure as the single copy. Additionally or alternatively, in such embodiments, the single copy may include one of the first data structure or the second data structure along with a change log including differences between the single copy and the other of the first partially decrypted data structure or the second partially decrypted data structure. The change log may permit remote storage server 110 to return the first data structure to the first client device and the second data structure to the second client device without storing two entire copies of the same.

In step 414, remote storage server 110 may index the single copy to the segment identifier. Additionally or alternatively, remote storage server 110 may index the single copy to the first key and/or the second key. Accordingly, steps 412, 413, and 414 may allow for selectively storing a copy of the second data structure based on whether content of the first data structure corresponds to content of the second data structure (e.g., as determined in step 410).

Additionally or alternatively, remote storage server 110 may index the single copy to a secure cookie or any other data structure to associate the copy with the first and second client devices 150 and/or with user accounts corresponding to the same. For example, remote storage server 110 may index the single copy to the first key and an identifier associated with the first client device (e.g., comprise a serial number, a universally unique identifier (UUID), a username, a certificate, or an Internet protocol (IP) address) and further index the single copy to the second key and an identifier associated with the second client device (e.g., comprise a serial number, a universally unique identifier (UUID), a username, a certificate, or an Internet protocol (IP) address). In such embodiments, remote storage server 110 may respond to pull requests from client devices 150 by mapping the requesting device to the single copy and corresponding one of the first or second key. In some embodiments, for example using a fuzzy search, remote storage server 110 may further index the change log to a corresponding one of the client devices 150 such that remote storage server 110 applies the change log before responding to request from that same client device.

For example, remote storage server 110 may receiving a request for content the first data structure from the first client device or the second client device, retrieve the partially decrypted first data structure; encrypt the partially decrypted first data structure using the first key or the second key based on which of the first client device or the second client device sent the request; and return the encrypted data structure to the first client device or the second client device. In such embodiments, remote storage server 110 may additionally or alternatively transmit the first key or the second key with the encrypted data structure. Additionally or alternatively, the first client device or the second client may already possess the first key or the second key, respectively, and thus be configured to decrypt the returned data structure.

As explained above, in some embodiments remote storage server 110 may validate the first client device or the second client device before returning the encrypting data structure. In such embodiments, for example, remote storage server 110 may generate a challenge for the requesting device (whether the first client device or the second client device) to answer. Remote storage server 110 may therefore validate a response to the challenge to ensure that the requesting device (whether the first client device or the second client device) is authorized to request and receive the requested data structure before returning the same.

Additionally or alternatively, remote storage server 110 may receive at least one of proof to access or a license to use the requested data structure with the request from the first client device or the second client device; verify the proof; and send a denial message rather than returning the encrypted data structure when the proof cannot be verified. The license may comprise a digital rights management (DRM) data structure or any other data structure authorizing the first client device or the second client device to view content included in the requested data structure. Although remote storage server 110 may verify the proof locally, remote storage server 110 may additionally or alternatively contact a third party configured to verify licenses to digital content and receive, from the third party, verification or denial of the proof.

With this process, content delivery system 105 takes advantage and maximizes the efficiency of the remote storages by reducing data redundancy. For example, remote storage server 110 frees up storage space by identifying overlapping content from users and storing a single copy of the same. Moreover, while process 400 requires extra keys to preclude remote storage server 110 from accessing the content, the extra keys add low overhead. Process 400 exploits data redundancies to improve efficiency, while hiding content that would require licenses or otherwise violate copyrights if otherwise exposed to remote storage server 110.

Figure 5:
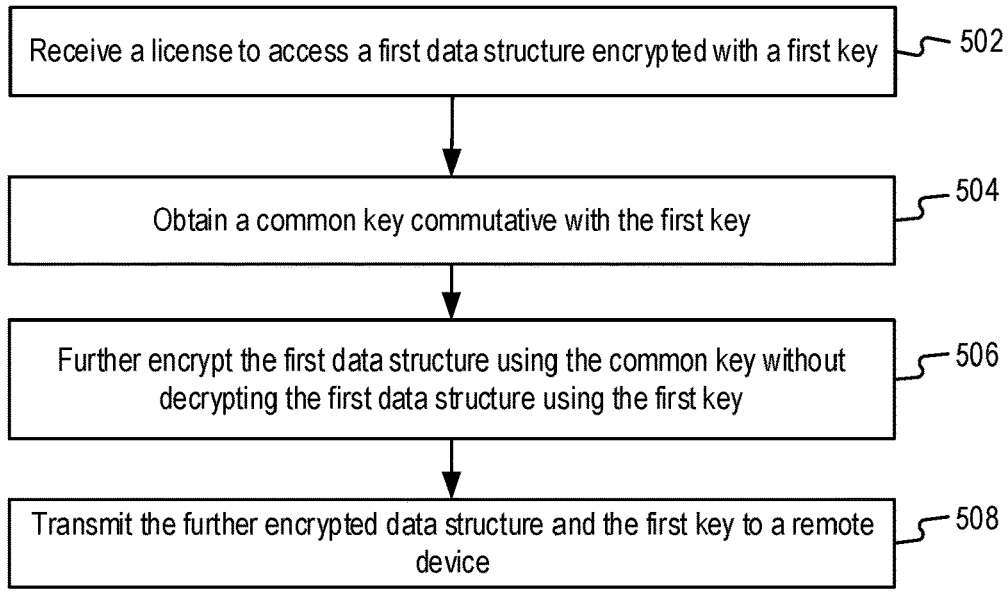
FIG. 5 is an exemplary flow chart illustrating uploading encrypted data structures to a remote storage, consistent with disclosed embodiments.

Referring now to FIG. 5, there is shown a flow chart of an exemplary process 500 for uploading of encrypted data structures to a remote storage, consistent with disclosed embodiments. In some embodiments, uploading process 500 may be executed by client devices 150 (FIG. 1). For example, uploading process 500 may be performed by processor(s) 302.

In step 502, client device 150 may receive a license to access a first data structure. Moreover, the first data structure may be encrypted with a first key. For example, client device 150 may request the first data structure from content distributor 140, e.g., using HTTP Live Streaming (HLS), MPEG-DASH content delivery, FTP or HTTP downloading, or the like. In other embodiments, for example, client device 150 may command content distributor 140 to prepare content to which client device 150 has a license to access with the first key. The license may comprise a digital rights management (DRM) data structure or any other data structure authorizing the client device 150 to view content included in the first data structure.

In step 504, client device 150 may obtain a common key allowing for commutative encryption along with encryption with the first key. In addition, in some embodiments, at least one of the first key or the common key may comprise a self-inverse encryption key. Additionally or alternatively, asymmetric encryption may be used such that at least one of the first key, the second key, or the common key comprise public-private key pairs. Remote storage server 110 may not have access to the common key. In other embodiments, for example, client device 150 may command content distributor 140 to encrypt content to which client device 150 has a license to access with the common key.

In step 506, client device 150 may encrypt the first data structure with the common key without decrypting the first data structure using the first key. In some embodiments, because encryption with the common key and encryption with the first key are commutative, client device 150 may apply the first key and the common key to the content within the first data structure in any order. In other embodiments, client device 150 may command content distributor 140 to encrypt content to which client device 150 has a license to access with the common key and the first key to form the first data structure.

In step 508, client device 150 may transmit, to a remote device, the encrypted first data structure along with the first key. For example, client device 150 may send a request to store the first data structure in association with an identifier of the client device 150 (or a user thereof) and the first key. In other embodiments, client device 150 may command content distributor 140 to encrypt content to which client device 150 has a license to access with the common key and the first key to form the first data structure and transmit the same to the remote device on behalf of client device 150.

Although not depicted in FIG. 5, client device 150 may further transmit a segment identifier associated with the encrypted first data structure. For example, as described above with respect to step 406, the segment identifier may comprise a hash of the content. Additionally or alternatively, any alphanumeric identifier (such as a UUID or a separate data structure comprising a certificate) may function as the segment identifier.

Steps 502-508 may allow the remote device (e.g., remote storage server 110 of FIG. 1) to determine if there are data redundancies to be eliminated in storing the first data structure, e.g., which may be executed according to process 400 of FIG. 4. Accordingly, with this process, client device 150 takes advantage and maximizes the efficiency of the remote device by allowing it to reduce data redundancy. Moreover, while process 500 requires extra keys to preclude the remote device from accessing the content, the extra keys add low overhead. Process 500 allows for exploitation of data redundancies to improve efficiency, while hiding content that would require licenses or otherwise violate copyrights if otherwise exposed to the remote device (e.g., remote storage server 110 of FIG. 1).

Client device 150 may further retrieve the stored data structure from the remote device. For example, client device 150 may send a request for the first data structure to the remote device and receive the first data structure encrypted with the common key. In addition, the received first data structure may be further encrypted with the first key, and client device 150 may, in response to the request, receive the first key (e.g., from the remote device). For example, client device 150 may request the receive the first data structure according to process 600 of FIG. 6 explained above.

As explained above, in some embodiments the remote device (e.g., remote storage server 110 of FIG. 1) may validate the client device 150 before returning the first data structure. In such embodiments, for example, the remote device (e.g., remote storage server 110 of FIG. 1) may generate a challenge for client device 150 to answer. The remote device may therefore validate a response to the challenge to ensure that client device 150 is authorized to request and receive the first data structure before returning the same. Additionally or alternatively, client device 150 may send at least one of proof to access or a license to use the requested data structure with the request and receive the first data structure or a denial message based on whether the proof can be verified by the remote device. The license may comprise a digital rights management (DRM) data structure or any other data structure authorizing the client device 150 to view content included in the requested data structure.

Figure 6:
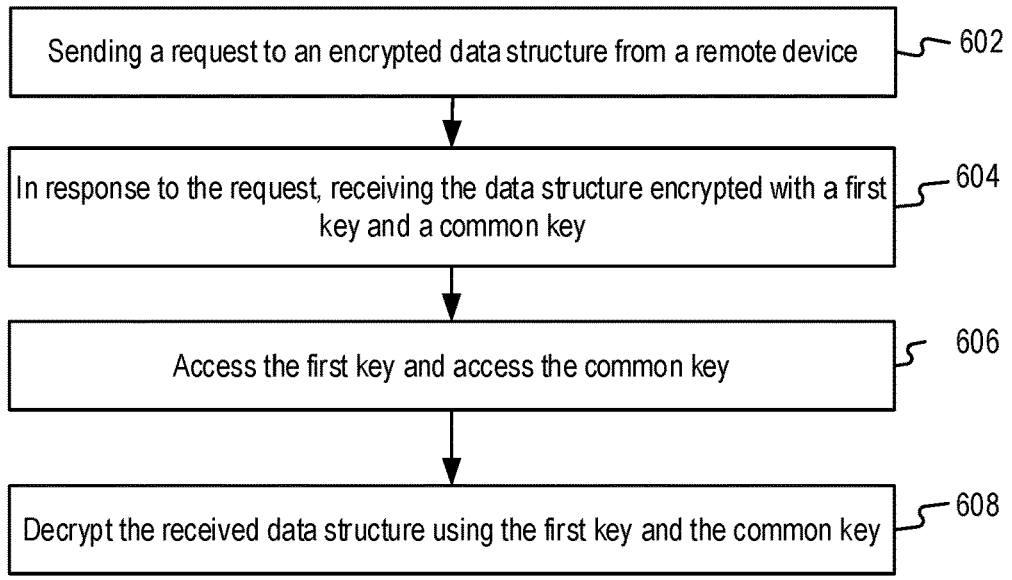
FIG. 6 is an exemplary flow chart illustrating receiving encrypted data structures from a remote storage, consistent with disclosed embodiments.

Referring now to FIG. 6, there is shown a flow chart of an exemplary process 600 for receiving encrypted data structures from a remote storage, consistent with disclosed embodiments. In some embodiments, receiving process 600 may be executed by client devices 150 (FIG. 1). For example, receiving process 600 may be performed by processor(s) 302.

In step 602, client device 150 may send, to a remote device, a request for an encrypted data structure along with at least one of proof to access or a license to use the data structure. For example, the proof may comprise a response to a challenge from the remote device. Moreover, the license may comprise a digital rights management (DRM) data structure or any other data structure authorizing the client device 150 to view content included in the requested data structure.

In step 604, client device 150 may, in response to the request and from the remote device, receive the encrypted data structure. Moreover, the data structure is encrypted with a first key and a common key, the common key accessible by the client device 150 and not by the remote device.

In step 606, client device 150 may access the first key and the common key. For example, client device 150 may access the first key from a previous or current authorization with content distributor 140. Additionally or alternatively, client device may access the common key from a key distribution center (KDC) as explained above.

In step 608, client device 150 may decrypt the received data structure using the first key and the common key. In some embodiments, because encryption with the common key and encryption with the first key are commutative, client device 150 may apply the first key and the common key to the received data structure in any order.

Steps 602-608 may allow the remote device (e.g., remote storage server 110 of FIG. 1) to distribute copyrighted content to multiple client devices 150 from a single copy if there are data redundancies, e.g., which were eliminated according to process 400 of FIG. 4. Accordingly, with this process, client device 150 takes advantage and maximizes the efficiency of the remote device by allowing it to reduce data redundancy. Moreover, while process 500 requires extra keys to preclude the remote device from accessing the content, the extra keys add low overhead. Process 600 allows for exploitation of data redundancies to improve efficiency, while hiding content that would require licenses or otherwise violate copyrights if otherwise exposed to the remote device (e.g., remote storage server 110 of FIG. 1).

Figure 7:
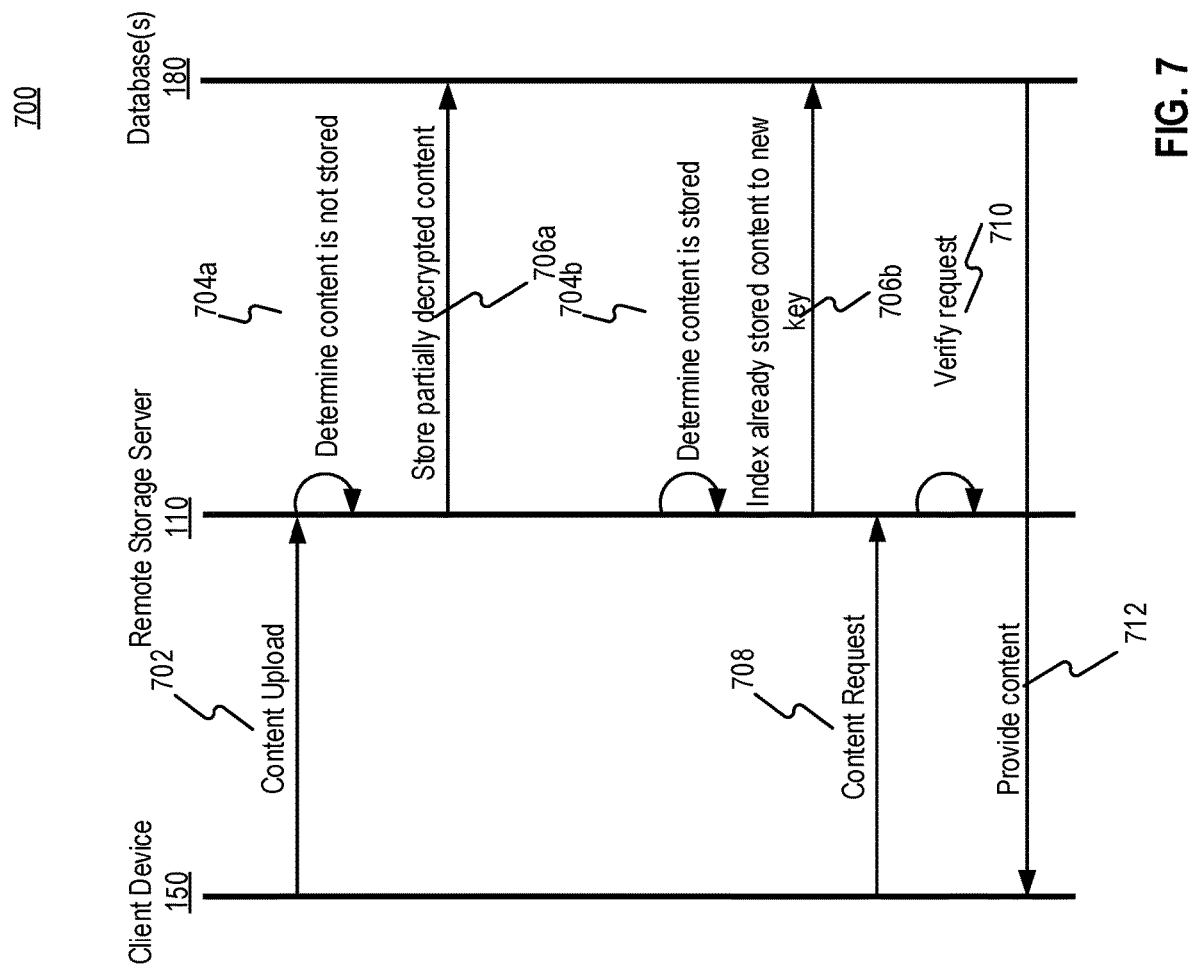
FIG. 7 is an exemplary process flow diagram for processing encrypted data structures for remote storage, consistent with disclosed embodiments

Referring now to FIG. 7, there is shown a process flow diagram for processing encrypted data structures for remote storage, consistent with disclosed embodiments. As shown in FIG. 7, process flow 700 may be implemented between client device 150 and remote storage server 110 with database(s) 180. In other embodiments, however, additional elements of system 100 (FIG. 1) can be incorporated to process flow 700. For example, content distributor 140 may perform some steps of process flow 700. Additionally or alternatively, process flow 700 may be executed between remote storage server 110 and multiple client devices 150.

In some embodiments some steps not shown in process flow 700 may be performed before content upload 702. For example, client device 150 may request content from content distributor 140 (e.g., via streaming, download, or the like). Additionally, in some embodiments, client device 150 may provide identification information to content distributor 140. Further, content distributor 140 may provide at least one of proof to access or a license to use the requested content as well as the content itself, which may be encrypted, in response to the request. Client device 150 may already have received an encryption key from content distributor 140 or may receive the encryption key with the content. These preparation steps, not shown in FIG. 7, may be executed by one or more components of system 100.

In step 702, client device 150 may transmit a request for remote storage of encrypted content. For example, client device 150 may transmit an HTTP or an FTP request with encrypted content. In some embodiments, the request may further include one key used to encrypt the content. Further, the content may be encrypted with at least two keys, one of which is included with the request and the other of which is secret from remote storage server 110.

In some embodiments, client device 150 may further transmit a segment identifier associated with the encrypted content sent by client device 150. For example, as described above with respect to step 406, the segment identifier may comprise a hash of the content. Additionally or alternatively, any alphanumeric identifier (such as a UUID or a separate data structure comprising a certificate) may function as the segment identifier.

In step 704a, remote storage server 110 may determine that the content is not in databases 180. For example, remote storage server 110 may use the received segment identifier to determine that the content is not in databases 180. Alternatively, remote storage server 110 may partially decrypt the received content using a key included in the request and determine that the partially decrypted content is not in databases 180. In embodiments where remote storage server 110 uses the segment identifier, remote storage server 110 may still partially decrypt the received content in order to verify that no errors or malicious data are included in the upload.

In response at step 706a, remote storage server 110 may store the partially decrypted content in databases 180 indexed to the segment identifier. Optionally, remote storage server 110 may add one or more additional layers of encryption using one or more keys known to remote storage server 110 and/or databases 180. Such key(s) may be unknown to client devices 150. In some embodiments, remote storage server 110 may further index the stored partially decrypted content to an identifier of client device 150 (or a user thereof) and/or to the key included in the request.

Alternatively, at step 704b, remote storage server 110 may determine that the content is already stored in databases 180. For example, remote storage server 110 may use the received segment identifier to determine that the content is already stored in databases 180. Alternatively, remote storage server 110 may partially decrypt the received content using a key included in the request and determine that the partially decrypted content is already stored in databases 180. In embodiments where remote storage server 110 uses the segment identifier, remote storage server 110 may still partially decrypt the received content in order to verify that no errors or malicious data are included in the upload.

In some embodiments, in response at step 706b, remote storage server 110 may index the existing copy of the partially decrypted content in databases 180 to an identifier of client device 150 (or a user thereof) and/or to the key included in the request. In other embodiments, no additional indexing is required from remote storage server 110.

In step 708, client device 150 may transmit a request for retrieval of stored encrypted content. For example, client device 150 may transmit an HTTP or an FTP request for the encrypted content. In some embodiments, the request may further include verification of an identity of client device 150 (or a user thereof) and/or proof to access (e.g., a response to a challenge from remote storage server 110) or a license to use (e.g., a DRM data structure) the stored encrypted content.

In step 710, remote storage server 110 may verify the request. In some embodiments, for example, remote storage server 110 may generate a challenge for the client device 150 to answer. Remote storage server 110 may therefore validate a response to the challenge to ensure that client device 150 is authorized to request and receive the requested data structure before returning the same.

Additionally or alternatively, remote storage server 110 may verify that client device 150 or a user thereof has adequate authorization to access the content (e.g., by verifying a license associated with DRM technology or the like). Additionally or alternatively, remote storage server 110 may resolve the identity of client device 150 or a user thereof (e.g., as a serial number, a universally unique identifier (UUID), a username, a certificate, an Internet protocol (IP) address, or the like) before returning the content to client device 150.

In step 712, remote storage server 110 may retrieve the content from the databases 180 and provide the content to the requesting client device 150.

Figure 8:
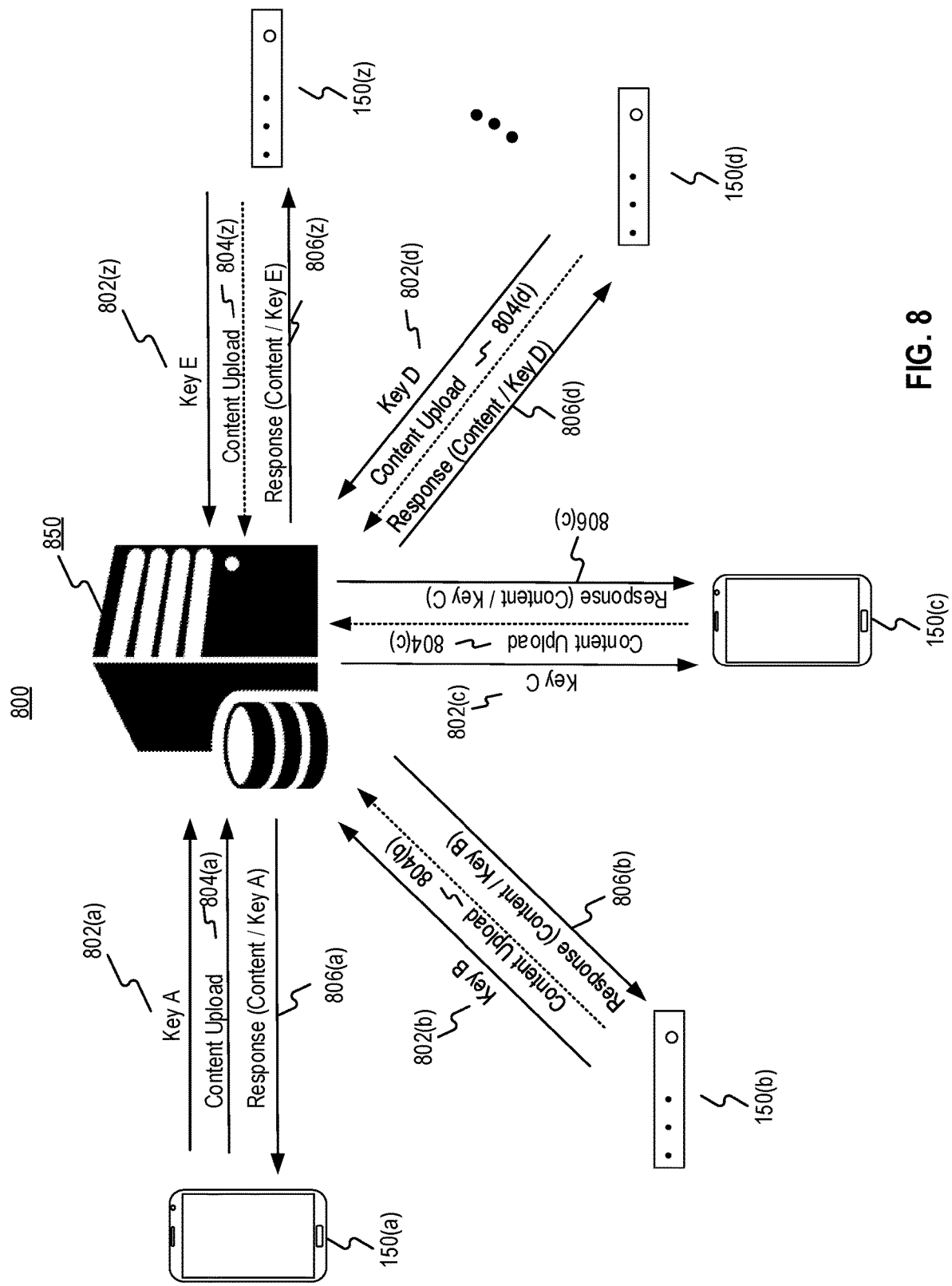
FIG. 8 is an exemplary schematic showing encrypted content storage using a plurality of client devices, consistent with disclosed embodiments.

FIG. 8 shows an exemplary schematic showing a representation of encrypted content storage using a plurality of client devices, consistent with disclosed embodiments. FIG. 8 shows that remote storage server 850 (remote storage server 110 of FIG. 1) communicates with a plurality of client devices 150(a)-150(z). Client devices 150 may have a plurality of operating systems and different license privileges to use copyrighted content. Literals used to reference individual elements in FIG. 8, e.g., (a), (b), or (z), do not specify the number of an element or the total number of elements. Instead, they are variable references that indicate a variable element number and a variable number of total elements. For example, literal (z) used to reference client device 150(z) does not indicate that device (z) is the $26^{th}$ device. Instead, (z) is a variable reference that could indicate any integer number. Therefore, sample device (z) is any one of client devices 150. Similarly, literals (a) and (b) used to reference, for example, client device 150(a), are also variable references that do not indicate or limit the element number or the total number of elements.

FIG. 8 shows remote storage server 110 may receive keys 802 from client devices 150. As shown in FIG. 8, each one of the keys 802 may be different (Keys A, B, C, D, and E). In other embodiments, for example, keys 802(a)-(z) may be the same if content distributor 140 re-uses keys across client devices 150

Client devices 150 may send uploads 804 to remote storage server 850 (remote storage server 110 of FIG. 1) to remotely store copyrighted content, such as videos, movies, songs, books, or the like. As previously described in connection with FIGS. 3A and 3B, uploads 804 may include double encrypted copies of the content as well as keys 802. The second layer of encryption with for the copies may use a key common to client devices 150 but hidden from remote storage server 850 (remote storage server 110 of FIG. 1). Although described as double encrypted, as explained above, the uploaded copies may include any number of layers of encryption.

Furthermore, as shown in FIG. 8, remote storage server 850 may not require an actual upload from each client device 150(a)-150(z). Instead, remote storage server 850 may use segment identifiers to identify when one of client devices 150(a)-150(z) requests to upload a segment already uploaded from another of client devices 150(a)-150(z) and indicate the segment as uploaded without requiring a further duplicative upload of the same content.

In response to requests 804, remote storage server 850 (remote storage server 110 of FIG. 1) may perform operations described above in connection to FIG. 4, to determine the uploaded content overlaps. For example, using segment identifiers associated with uploads 804 and/or the keys 802 included in uploads 804, remote storage server 850 (remote storage server 110 of FIG. 1) may identify the content as overlapping without accessing cleartext versions of the content. For example, encryption with keys 802 may commute with encryption with the common key such that remote storage server 850 (remote storage server 110 of FIG. 1) may decrypt using keys 802 while retaining the encryption with the common key. Then, remote storage server 850 (remote storage server 110 of FIG. 1) may store a single copy of the content indexed to the common segment identifier. Additionally, remote storage server 850 may optionally index the content from different client devices 150 to keys 802. By using a single copy of overlapping content for client devices 802, remote storage server 850 (remote storage server 110 of FIG. 1) may reduce storage redundancy.

After storage and in response to requests from client devices 150, remote storage server 850 (remote storage server 110 of FIG. 1) may re-distribute the content accordingly. For example, remote storage server 850 (remote storage server 110 of FIG. 1) may return the content with corresponding keys 802 to client devices 150. Additionally or alternatively, in some embodiments remote storage server 850 (remote storage server 110 of FIG. 1) may re-encrypt the content using the corresponding keys 802 before returning the re-encrypted content to corresponding ones of client devices 150. Accordingly, with this arrangement a remote storage may use existing technology to avoid duplicate data storage with a scalable and affordable solution that does not expose cleartext versions of content to the remote storage itself.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for maximizing storage of encrypted content in a storage system comprising:
   one or more hardware processors; and
   a non-transitory computer readable storage medium storing instructions that, when executed, cause the one or more processors to perform operations comprising:
   receiving, from a first client device, an encrypted version of a first data structure and a first metadata associated with the first data structure, wherein the first data structure is encrypted commutatively with at least a first key and a common key, and wherein the one or more processors do not have access to the common key;
   receiving the first key;
   using the first key, partially decrypting the encrypted first data structure;
   storing the partially decrypted first data structure;
   receiving, from a second client device, an encrypted version of a second data structure and a second metadata associated with the second data structure, wherein the second data structure is encrypted commutatively with a second key and the common key;
   receiving the second key;
   using the second key, partially decrypting the encrypted second data structure;
   selectively storing a copy of the partially decrypted second data structure based on whether content of the partially decrypted first data structure corresponds to content of the partially decrypted second data structure;
   indexing the encrypted first data structure to an associated segment identifier using the first key, wherein the associated segment identifier is used to identify the first data structure;
   validating the first client device based on the indexed encrypted first data structure;
   indexing the encrypted second data structure to a different associated segment identifier using the second key, wherein the different associated segment identifier is used to identify the second data structure; and
   validating the second client device based on the indexed encrypted second data structure,
   wherein the operations further comprise:
   indexing the stored partially decrypted first data structure and the first key to a first client device identifier; and
   indexing the stored partially decrypted first data structure and the second key to a second client device identifier when the content of the partially decrypted first data structure corresponds to content of the partially decrypted second data structure.

2. The system of claim 1, wherein at least one of the first key, the second key, or the common key comprise a symmetrical encryption key.

3. The system of claim 1, wherein the operations further comprise:
   receiving a request for content of the partially decrypted first data structure from the first client device or the second client device;
   retrieving the partially decrypted first data structure;
   re-encrypting the first data structure by encrypting the partially decrypted first data structure using the first key or the second key based on which of the first client device or the second client device sent the request; and
   returning the re-encrypted first data structure to the first client device or the second client device.

4. The system of claim 3, wherein the one or more processors transmit the first key or the second key with the re-encrypted first data structure.

5. The system of claim 3, wherein the operations further comprise:
   receiving at least one of proof to access or license to use the content of the requested partially decrypted first data structure with the request from the first client device or the second client device;
   extracting the first key or the second key from the at least one of proof or a license; and
   encrypting the partially decrypted first data structure using the extracted first key or second key.

6. The system of claim 3, wherein the operations further comprise:
   based on the request, sending a challenge to the first client device or the second client device; and
   based on a response to the challenge, determining that the first client device or the second client device has had access to or has a license to use the content of the requested partially decrypted first data structure,
   wherein the one or more processors return the re-encrypted first data structure in response to the determination.

7. The system of claim 6, wherein determining that the first client device or the second client device has had access to or has a license to use the content of the requested partially decrypted first data structure comprises:
contacting a third party configured to verify licenses to digital content; and
receiving, from the third party, the determination.

8. The system of claim 1, wherein the operations further comprise:
receiving a first segment identifier associated with the encrypted first data structure;
receiving a second segment identifier associated with the encrypted second data structure; and
determining whether content of the encrypted first data structure corresponds to content of the encrypted second data structure based on the first segment identifier associated with the encrypted first data structure and the second segment identifier associated with the encrypted second data structure.

9. The system of claim 8, wherein the operations further comprise receiving the first segment identifier from the first client device or receiving the second segment identifier from the second client device.

10. The system of claim 8, wherein the operations further comprise instructing the second client device not to transmit the encrypted second data structure when the first segment identifier associated with the encrypted first data structure and the second segment identifier associated with the encrypted second data structure comprise a fuzzy match.

11. The system of claim 8, wherein the segment identifiers comprise a universally unique identifier (UUID) or a certificate.

12. The system of claim 1, wherein the one or more processors receive the encrypted first data structure from a first portion of the first client device and the first key from a second portion of the first client device.

13. The system of claim 12, wherein the first portion and the second portion comprise distinct hardware components.

14. The system of claim 12, wherein the first portion and the second portion comprise distinct software components executed as isolated application instances.

15. The system of claim 1, wherein the one or more processors receive the encrypted first data structure using a first computer network and the first key using a second computer network at least partially different from the first computer network.

* * * * *